US006347998B1

(12) United States Patent
Yoshitomi et al.

(10) Patent No.: US 6,347,998 B1
(45) Date of Patent: Feb. 19, 2002

(54) GAME SYSTEM AND COMPUTER-READABLE RECORDING MEDIUM

(75) Inventors: Kensuke Yoshitomi; Takahiro Omori; Fumihito Miyauchi, all of Tokyo (JP)

(73) Assignee: Konami Co., Ltd., Tokyo (JP)

( * ) Notice: Subject to any disclaimer, the term of this patent is extended or adjusted under 35 U.S.C. 154(b) by 35 days.

(21) Appl. No.: 09/603,251

(22) Filed: Jun. 26, 2000

(30) Foreign Application Priority Data

Jun. 30, 1999 (JP) .......................................... 11-186694

(51) Int. Cl.[7] .......................... A63F 13/00; A63F 9/24; G06F 17/00; G06F 19/30

(52) U.S. Cl. ............................ 463/42; 463/30; 463/35; 463/36; 463/37; 463/43; 273/148 R; 273/454; 273/460; 700/90; 700/91; 700/94

(58) Field of Search ............................ 463/42, 43, 30, 463/31, 32, 33, 34, 35, 36, 37, 38, 46, 47, 1, 7; 273/453, 454, 460, 461, 148 B, 148 R; 700/90, 91, 92, 94

(56) References Cited

U.S. PATENT DOCUMENTS 5,513,129 A * 4/1996 Bolas et al. ................ 364/578
6,001,013 A * 12/1999 Ota ........................... 463/7 X
6,039,658 A * 3/2000 Cecchin .................. 473/269 X
6,116,908 A * 9/2000 Taika ..................... 434/250 X
6,227,968 B1 * 5/2001 Suzuki et al. ............... 463/7 X

* cited by examiner

*Primary Examiner*—Valencia Martin-Wallace
*Assistant Examiner*—Binh-An D. Nguyen
(74) *Attorney, Agent, or Firm*—Jordan and Hamburg LLP

(57) ABSTRACT

In a game system, performance data which stipulates sequences of manipulations and allocation of sound effects for the manipulations can be set practically. The game system has memory device which stores performance data stipulating manipulations of a controller provided in correspondence with a predetermined musical piece; the performance data comprises information specifying a manipulation timing relating to at least one timing manipulation member provided on the controller, and information specifying which one of a plurality of selection manipulation members provided on the controller is to be manipulated in correspondence with the manipulation of the timing manipulation member; either one of the information specifying the manipulation timing included in the performance data and the information specifying the selection manipulation member can be edited independently of the other based on a command supplied via the controller by a player.

13 Claims, 22 Drawing Sheets

GAME SYSTEM AND COMPUTER-READABLE RECORDING MEDIUM

BACKGROUND OF THE INVENTION

1. Field of the Invention

The present invention relates to a game system which is manipulated as entertainment in time to music.

2. Description of the Related Art

A game system manipulated as entertainment in time to music was for example disclosed in Japanese Patent Application Laid-Open (TOKU-KAI-HEI) No. 11-151380. In this type of game system, commands for a series of manipulations of an input apparatus are specified to a player on the game screen of a monitor in time with music which is reproduced as background music (BGM). When the player manipulates the input apparatus in accordance with the specified commands, sound effects corresponding to the manipulations are superimposed over the BGM. In addition, the player is evaluated based on the degree of accordance between the specified manipulation sequence and the actual manipulations carried out by the player.

In the musical game described above, data determining the manipulation sequence of the input apparatus is provided for each musical piece, but as the player repeatedly plays the game he or she gets accustomed to the manipulation and loses his or her interest in the game. In view of this, the player wants to change the manipulation sequence of the input apparatus as he or she desires and to arrange the sound effects allocated to the manipulations so as to suit his or her own tastes. However, the players might find it confusing to create the data by themselves and they may not be able to create the desired data.

SUMMARY OF THE INVENTION

Accordingly, it is an object of this invention to provide a game system wherein it is possible to practically set performance data specifying the procedure of manipulations and the allocation of sound effects to the manipulations.

A first aspect of this invention provides a game system comprising an input apparatus which is manipulated by a player; performance data memory device which stores performance data stipulating a series of manipulations of the input apparatus arranged in correspondence with a predetermined musical piece; manipulation guide device which specifies the series of manipulations of the input apparatus arranged in correspondence with the musical piece to the player based on the performance data; the performance data comprising information which specifies timings of manipulations relating to at least one timing manipulation member provided on the input apparatus, and information which specifies at least one selection manipulation member to be manipulated in correspondence with the manipulation of the timing manipulation member from a plurality of selection manipulation members provided on the input apparatus; and editing device which edits either one of the information specifying the manipulation timing of the performance data and the information specifying the selection manipulation member independently of the other based on a command supplied by a player via the input apparatus.

According to this aspect, it is possible to edit only the specifications of a selection manipulation member to be manipulated in correspondence with the manipulation of a timing manipulation member of an input apparatus as the player wants, and conversely to edit only the timing at which the timing manipulation member is manipulated, without changing the timings which control the timing manipulation member. Therefore, an operation of editing the performance data is easier to understand than when simultaneously changing the specifications relating to the manipulation timing and selection manipulation members, whereby even a person who is not familiar with the manipulation can create performance data as he or she desires without confusion.

In a second aspect of this invention, the game system according to the first aspect further comprises edit screen display device which displays an edit screen wherein note marks corresponding to manipulations of the timing manipulation members contained in a predetermined range of the musical piece are arranged so that their relationship with the selection manipulation members to be manipulated in correspondence with manipulation of the timing manipulation members is identifiable in a predetermined direction along a time axis based on the performance data; scrolling device which changes the correspondence relationship between the musical piece and the predetermined range in response to a predetermined scrolling manipulation of the input apparatus so that an editing position set in the edit screen moves forward or backward in relation to the musical piece; and edit executing device which changes the information specifying the selection manipulation member in response to a predetermined selection setting manipulation of the input apparatus so that the correspondence relationship between a note mark displayed at the editing position of the edit screen and the selection manipulation member changes.

According to this aspect, the player can use the scrolling device to move a desired note mark to the editing position, and change the selection manipulation member corresponding to that note mark. Therefore, it is possible to change the manipulation of the selection manipulation member while confirming this on the edit screen, without changing the timing of the manipulation of the timing manipulation member.

A third aspect of this invention comprises the game system according to the second aspect, wherein the editing device comprises timing adjusting device which changes the information specifying a timing of a manipulation of the timing manipulation member so that said timing corresponding to a note mark displayed at the editing position of the edit screen changes in response to a timing adjustment manipulation of the input apparatus.

According to this aspect, the timing at which the timing manipulation member is to be manipulated can be moved forward and backward in the musical piece as the player desires. Therefore, it is possible to intentionally adjust the manipulation so as to delay or advance it as a technique of performing the music.

A fourth aspect of this invention comprises the game system according to the second or third aspects, further comprising audio output device; and sound effect data recording device in which sound effect data for reproducing a plurality of sound effects via the audio output device are stored; the performance data comprising information specifying allocations of the sound effects to each manipulation of the input apparatus; and the editing device comprising sound effect setting device which changes the information specifying the allocations of the sound effects in response to a sound effect setting manipulation of the input apparatus so that the allocations of the sound effects to manipulations corresponding to note marks displayed at the editing position of the edit screen changes.

According to this aspect, the player can change the sound effects to be generated in compliance with the manipulation of the input apparatus as he or she desires.

A fifth aspect of this invention comprises the game system according to the fourth aspect, wherein the editing device further comprises a sample display device which displays a sample screen showing a correspondence relationship between manipulation of the input apparatus stipulated by performance data set as a sample and the allocations of the sound effects; and allocation executing device which allocates sound effects displayed in the sample screen as sound effects corresponding to note marks displayed at the editing position of the edit screen.

According to this aspect, the sound effect can be efficiently allocated while consulting already existing performance data.

A sixth aspect of this invention comprises the game system according to the fifth aspect, wherein performance data being edited can be set as the sample. In this case, a sound effect which was allocated earlier can be efficiently reallocated to another position, and the like.

A seventh aspect of this invention comprises the game system according to the fifth aspect, wherein a plurality of performance data are provided for a single musical piece, and performance data different from the performance data being edited can be set as the sample. In this case, sound effects used in another musical piece can be easily allocated as sound effects for the performance data being edited, thereby increasing the flexibility of the editing operation.

An eighth aspect of this invention provides a game system comprising an input apparatus which is manipulated by a player; performance data memory device which stores performance data stipulating a series of manipulations of the input apparatus arranged in correspondence with a predetermined musical piece; manipulation guide device which specifies the series of manipulations of the input apparatus arranged in correspondence with the musical piece to the player based on the performance data; the performance data comprising information which specifies timings of manipulations relating to at least one timing manipulation member of the input apparatus, and information which specifies at least one selection manipulation member to be manipulated in correspondence with the manipulation of the timing manipulation member from a plurality of selection manipulation members of the input apparatus; edit screen display device which displays an edit screen having a display range corresponding to part of the musical piece based on the performance data; scrolling device which continuously changes the relationship between the musical piece and the display range in response to a predetermined record start manipulation of the input apparatus so that the editing position in the edit screen continuously changes forwards or backwards with respect to the musical piece; and edit recording device which detects at least one part of the manipulations of the timing manipulation members and the plurality of selection manipulation members with respect to the input apparatus while the relationship between the musical piece and the display range is being changed by the scrolling device, displays a note mark corresponding to the detected manipulation in the edit screen, and changes the performance data so that the manipulation corresponding to the note mark is stipulated in the performance data.

According to this aspect, the scrolling of the edit screen starts when a record start manipulation is carried out to the input apparatus. Then, when the timing manipulation member and selection manipulation member of the input apparatus are manipulated during scrolling, a note mark is displayed in the edit screen in accordance with the manipulation and the performance data is changed in accordance with the change in the display. Therefore, the manipulations of the input apparatus in a predetermined range of the musical piece can be efficiently edited.

A ninth aspect of this invention comprises the game system according to the eighth aspect, further comprising mode selecting device in which a timing specifying mode for specifying only the timing of manipulations of the timing manipulation member can be selected; and wherein when the timing specifying mode is selected, the edit recording device detects a manipulation of the timing manipulation member, displays a note mark corresponding to the detected manipulation in the edit screen, and changes the information specifying the timing of the performance data so that the manipulation corresponding to the note mark is stipulated by the performance data.

According to this aspect, it is possible to prevent the editing process from becoming complex and to improve the efficiency of the specification of the manipulation timing by making it possible to continuously specify only the manipulation timing of the timing manipulation member, thereby.

A tenth aspect of this invention comprises the game system according to the eighth aspect, further comprising mode selecting device in which a timing specifying mode for specifying only the timing of manipulations of the timing manipulation member can be selected; and wherein when the timing specifying mode is selected, the edit recording device detects a manipulation of the timing manipulation member, displays a note mark corresponding to the detected manipulation in the edit screen in correspondence with a specific selection manipulation member, and changes the information specifying the timing and the information specifying the selection manipulation member of the performance data so that the manipulation corresponding to the note mark is stipulated in the performance data as a manipulation of the timing manipulation member in correspondence with the manipulation of the specific selection manipulation member.

According to this aspect, it is possible to suspend the specification of the selection manipulation member and continuously specify temporarily only the manipulation timing of the timing manipulation member, thereby preventing the editing process from becoming complex and improving the efficiency of the specification of the manipulation timing, as in the ninth aspect. Since the edit screen provisionally displays the specified manipulation timings so as to relate to the specific selection manipulation member, the status of the specification of the manipulation timing can be easily confirmed.

An eleventh aspect of this invention comprises the game system according to one of the eighth to tenth aspects, further comprising mode selecting device in which a selection change mode for changing a specification of the selection manipulation member stipulated in performance data being edited can be selected; and wherein the edit screen display device displays note marks in correspondence with manipulations of the timing manipulation members contained in the display range of the musical piece in a predetermined direction along the time axis based on the performance data being edited, so that the relationship between the note marks and the selection manipulation members to be manipulated in correspondence with manipulations of the timing manipulation member is identifiable; and when the selection change mode is selected, the edit recording device detects a manipulation of the selection manipulation member, changes the relationship between the selection manipulation member and the note mark displayed at the editing position in the edit screen at the point when the manipulation is detected based on the detected manipulation, and changes the information specifying the selection manipulation member in the performance data in accordance with the change.

According to this aspect, it is possible to continuously specify only the selection of the selection manipulation member. Therefore, in the case where only the manipulation timing of the timing manipulation member has been stipulated by the invention of the ninth and tenth aspects, the selection manipulation member need only be specified later by using this invention, enabling the desired performance data to be created.

A twelfth aspect of this invention comprises a computer-readable recording medium which stores performance data stipulating a series of manipulations of an input apparatus provided in a game system in correspondence with a predetermined musical piece, the performance data comprising information which specifies timings of manipulations relating to at least one timing manipulation member provided in the input apparatus, and information which specifies at least one selection manipulation member to be manipulated in correspondence with the manipulation of the timing manipulation member from a plurality of selection manipulation members provided in the input apparatus. The recording medium further stores a program which allows a computer provided in the game system to function as editing device for editing either one of the information specifying the manipulation timing of the performance data and the information specifying the selection manipulation member independently of the other based on a command supplied by a player via the input apparatus.

According to this aspect, the game system of the first aspect can be configured by allowing a computer to read and execute programs stored in the recording medium.

A thirteenth aspect of this invention comprises a computer-readable recording medium which stores performance data stipulating a series of manipulations of an input apparatus provided in a game system in correspondence with a predetermined musical piece, the performance data comprising information which specifies timings of manipulations relating to at least one timing manipulation member provided in the input apparatus, and information which specifies at least one selection manipulation member to be manipulated in correspondence with the manipulation of the timing manipulation member from a plurality of selection manipulation members provided in the input apparatus. The recording medium further stores a program which allows a computer provided in the game system to function as edit screen display device which displays an edit screen having a display range corresponding to part of the musical piece based on the performance data; scrolling device which continuously changes the relationship between the musical piece and the display range in response to a predetermined record start manipulation of the input apparatus so that the editing position in the edit screen continuously changes forwards or backwards with respect to the musical piece; and edit recording device which detects at least one part of the manipulations of the timing manipulation members and the plurality of selection manipulation members with respect to the input apparatus while the relationship between the musical piece and the display range is being changed by the scrolling device, displays a note mark corresponding to the detected manipulation in the edit screen, and changes the performance data so that the manipulation corresponding to the note mark is stipulated in the performance data.

According to this aspect, the game system of the eighth aspect can be configured by allowing a computer to read and execute programs stored in the recording medium.

In all the aspects, "editing" is used to signify a concept including newly creating information and changing existing information. The manipulations of the selection manipulation members corresponding to the manipulations of the timing manipulation members may comprise simultaneous manipulations wherein the timing manipulation members are manipulated while the selection manipulation members are being manipulated, such as for example the manipulation of guitar frets and picking manipulation. The game system of the present invention may comprise device which reproduces a musical piece corresponding to a series of manipulations of the manipulation guide device as BGM in synchronism with the series of manipulations. The edit screen may comprise mutually parallel areas which correspond separately to the selection manipulation members; the note marks for showing the timing of the manipulations of the timing manipulation member are displayed in the areas corresponding to the selection manipulation members to be manipulated in correspondence with the manipulation of the timing manipulation member. A screen having the same constitution as the edit screen may be used for specifying manipulation in the manipulation guide device.

DESCRIPTION OF THE PREFERRED EMBODIMENTS

Figure 1:
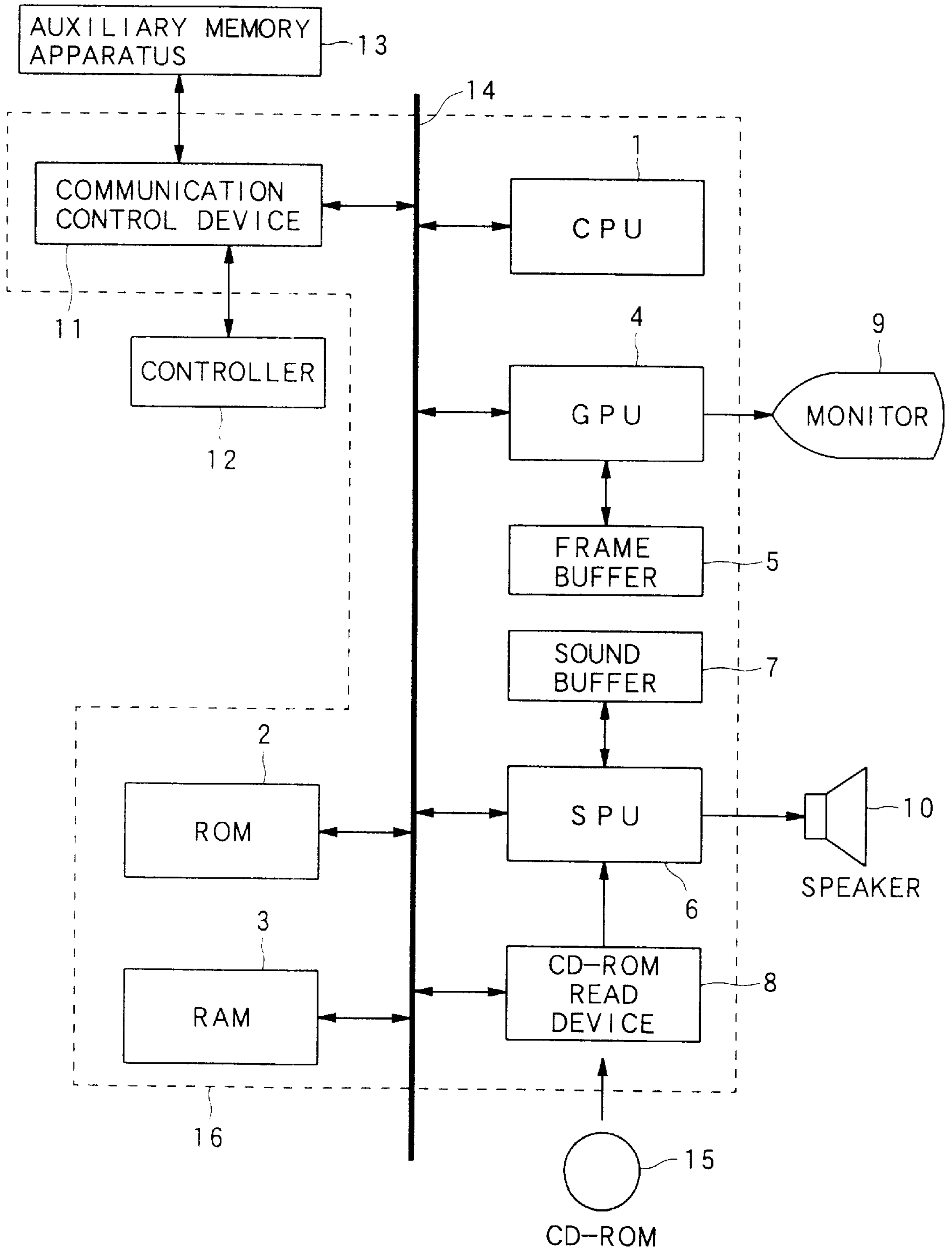
FIG. 1 is a block diagram of a game system according to an embodiment of the present invention.

FIG. 1 is a block diagram showing a control system of a game system for home use in which the present invention has been applied. The game system for home use executes a predetermined game in compliance with a game program stored in a CD-ROM 15 as a recording medium.

The game system comprises a CPU 1 mainly comprising a microprocessor; a ROM 2 and a RAM 3 which function as main memory apparatuses for the CPU 1; a graphics processing unit (GPU) 4 and a sound processing unit (SPU) 6 for image processing and audio processing respectively; buffers 5 and 7 for these units; and a CD-ROM reading apparatus 8. An operating system as a program needed for controlling the operations of the entire game apparatus is written in the ROM 2 as required. Programs and data for the game which have been read from the CD-ROM 15 constituting a recording medium are written in the RAM 3. The GPU 4 receives image data from the CPU 1 and paints a game screen on the buffer 5. In addition, the GPU 4 converts the data of the painted image to predetermined video reproduction signals and outputs them at a predetermined timing to a monitor 9. The SPU 6 reproduces data such as music, notes, sound source data and the like, which have been read from the CD-ROM 15 and recorded in the sound buffer 7, and outputs them from a speaker 10. In compliance with instructions from the CPU 1, the CD-ROM read apparatus 8 reads the programs and data stored in the CD-ROM 15 and outputs a signal corresponding to the contents thereof. Programs and data needed for executing the game are stored in the CD-ROM 15, and will be explained later. Generally, a television set for home use is used as the monitor 9 and a built-in speaker of the television set is used as the speaker 10.

Moreover, a communications control device 11 is connected to the CPU 1 via a bus 14. A controller 12 and an auxiliary memory apparatus 13 are connected attachably to/detachably from to the communications control device 11. The controller 12 functions as an input apparatus, and has manipulation members which are manipulated by the player. The communications control device 11 scans the manipulation status of the manipulation members of the controller 12 in a fixed cycle (e.g. a sixtieth of a second) and outputs a signal corresponding to the result of the scan to the CPU 1. The CPU 1 determines the manipulation status of the controller 12 based on the signal. The controller 12 and the auxiliary memory apparatus 13 can be connected in multiple series to the communications control device 11.

In the constitution described above, the constituent elements other than the monitor 9, the speaker 10, the controller 12, the CD-ROM 15 and the auxiliary memory apparatus 13, form a game unit main body 16 solidly contained in a predetermined housing.

Many constitutions can be used for the controller 12. For example, it is possible to use the controller for ordinary use 12A shown in FIGS. 2A and 2B, or the controller 12B for special use shown in FIGS. 3A to 3C. Hereinafter, if there is no need to distinguish between the controllers 12A and 12B, these will be referred to as “the controller 12.”

Figure 2A:
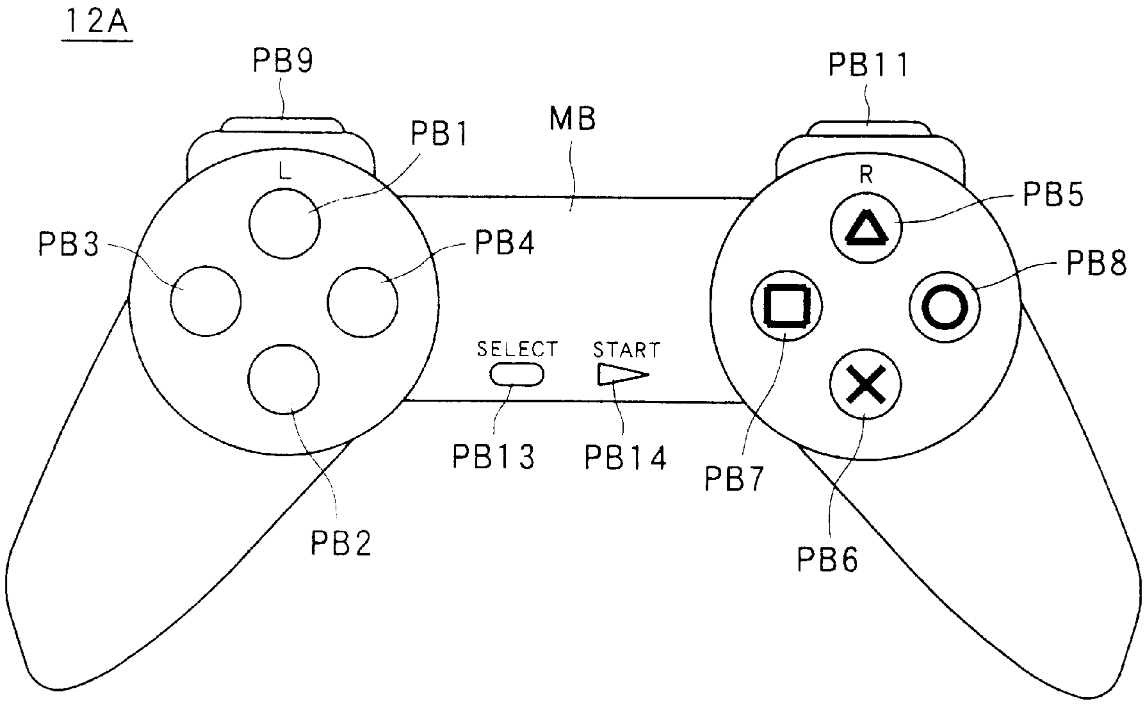
FIGS. 2A and 2B are diagrams showing a controller for ordinary use which is used in the game system of FIG. 1.
Figure 2B:
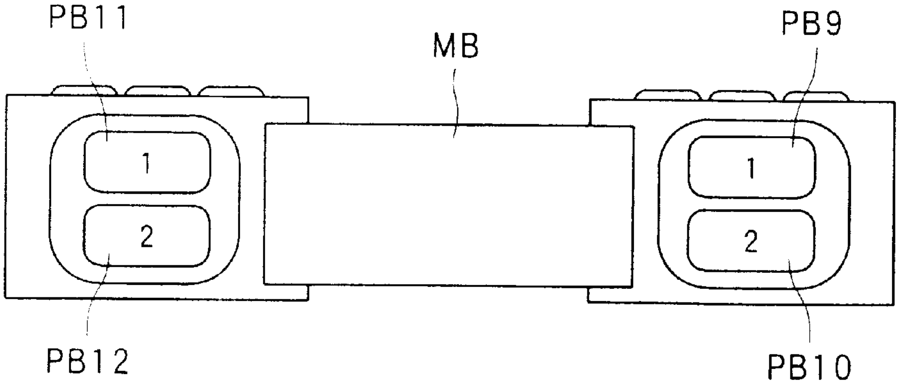

The controller for ordinary use 12A of FIGS. 2A and 2B is used generally irrespective of the type of game and comprises a main body MB manufactured using resin. The left and right sides of the main body MB each have four push-button switches PB1 to PB4 and PB5 to PB8 which are provided in a cross-like arrangement, and two push-button switches PB9 to PB 12 on the front sides of the main body MB. Small push-button switches PB13 and PB14 are provided in the center of the main body MB. The left-side push-button switches PB1 to PB4 are generally used for specifying the movement direction of characters, a cursor, and the like, and are sometimes referred to together as direction specification switches. Various types of game commands and the like are allocated to the four right-side push-button switches PB5 to PB8. Symbols “Δ”, “X”, “□” and “○” are for example displayed on the push-button switches PB5 to PB8. The numeral “1” is indicated on the push-button switches PB9 and PB11, and the numeral “2” is indicated on the push-button switches PB10 and 12. The push-button switch PB9 is termed “L1 button”, PB10 is termed “L2 button”, PB11 is termed “R1 button”, and PB12 is termed “R2 button”. Moreover, the push-button switch PB13 is termed a select button, and the push-button switch PB14 is termed a start button.

Figure 3A:
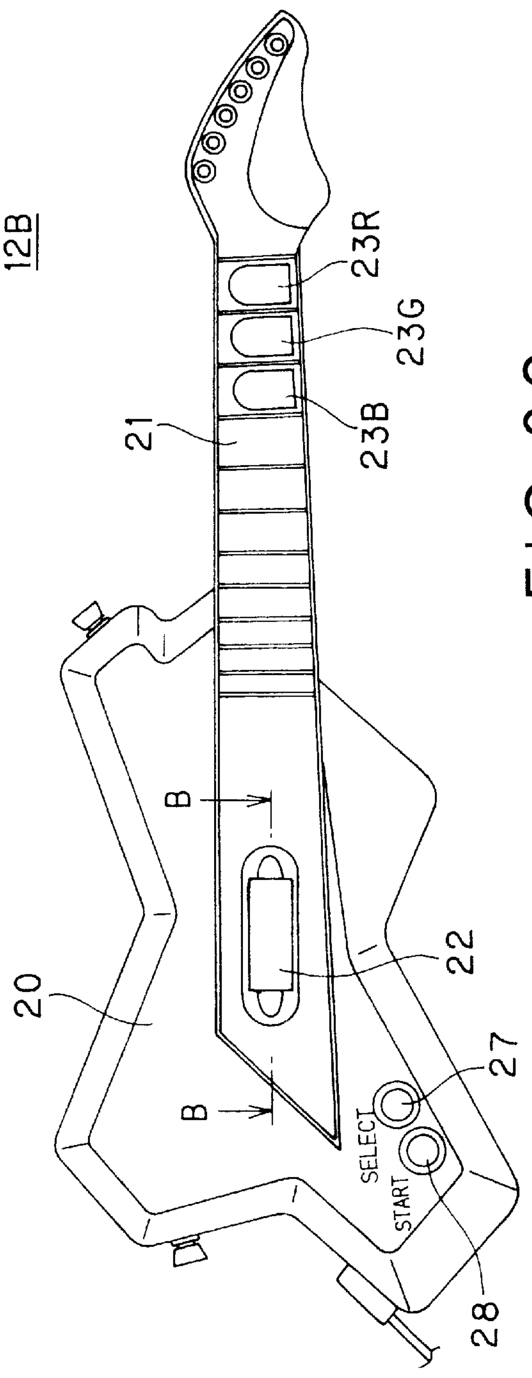
FIGS. 3A to 3C are diagrams showing a guitar-shaped dedicated controller which is used in the game system of FIG. 1.
Figure 3B:
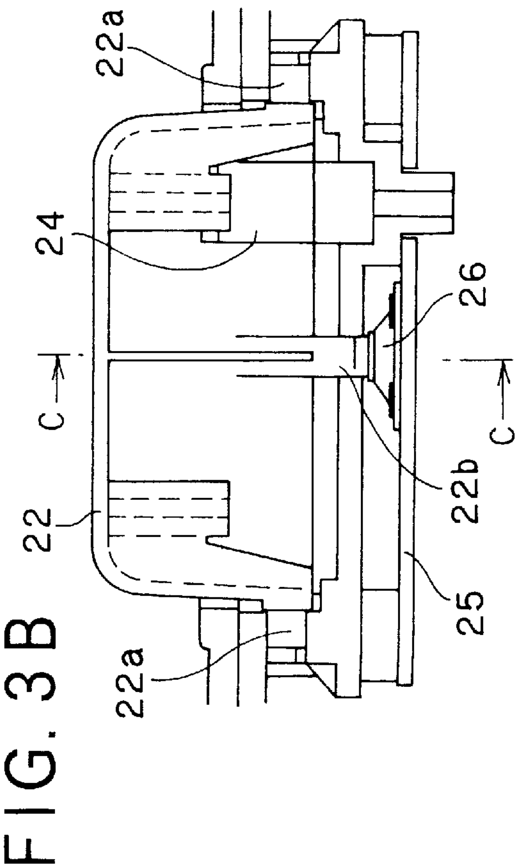
Figure 3C:
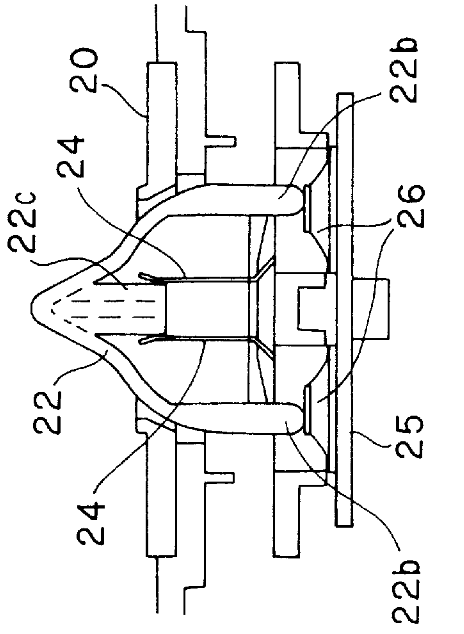

The controller for special use 12B of FIGS. 3A to 3C schematically represents an electric guitar, and comprises a body 20 and a neck 21. A picking lever 22 constitutes a timing manipulation member and is provided in the center of the body 20. Neck buttons 23R, 23G and 23B constitute selection manipulation members and are provided at the tip of the neck 21. The neck buttons 23R, 23G and 23B can be manipulated by pressing, and their manipulations are detected individually by push-button switches built in the neck 21. The neck buttons 23R, 23G and 23B are distinguished by color, being respectively red, green and blue.

FIG. 3B is a cross-sectional view taken along the line B—B of FIG. 3A, and FIG. 3C is a cross-sectional view taken along the line C—C of FIG. 3C. As is clear from FIGS. 3B and 3C, the picking lever 22 is attached to the body 20 in a manner such that it can swing around axes 22*a* and 22*a* which are provided at the ends of its length, and is supported approximately in the center of its swing range by a pair of plate springs 24 and 24 which are provided on both sides of a spring-receiver 22*c*. A switch board 25 is provided below the lever 22, and a pair of push-button switches 26 and 26 is provided on the board 25. When the picking lever 22 is manipulated against the plate springs 24 so that it inclines upward or downward around the axes 22*a* and 22*a* as its supporting points, the foot 22*b* of the lever 22 presses the switch 26 whereby the inner connected point becomes conductive. Thus the manipulation of the picking lever 22 is detected.

As shown in FIG. 3A, a select button 27 and a start button 28 are further provided on the body 20. These buttons function in the same way as the select button PB13 and the start button PB14 of the controller for ordinary use 12A of FIGS. 2A and 2B.

Figure 4:
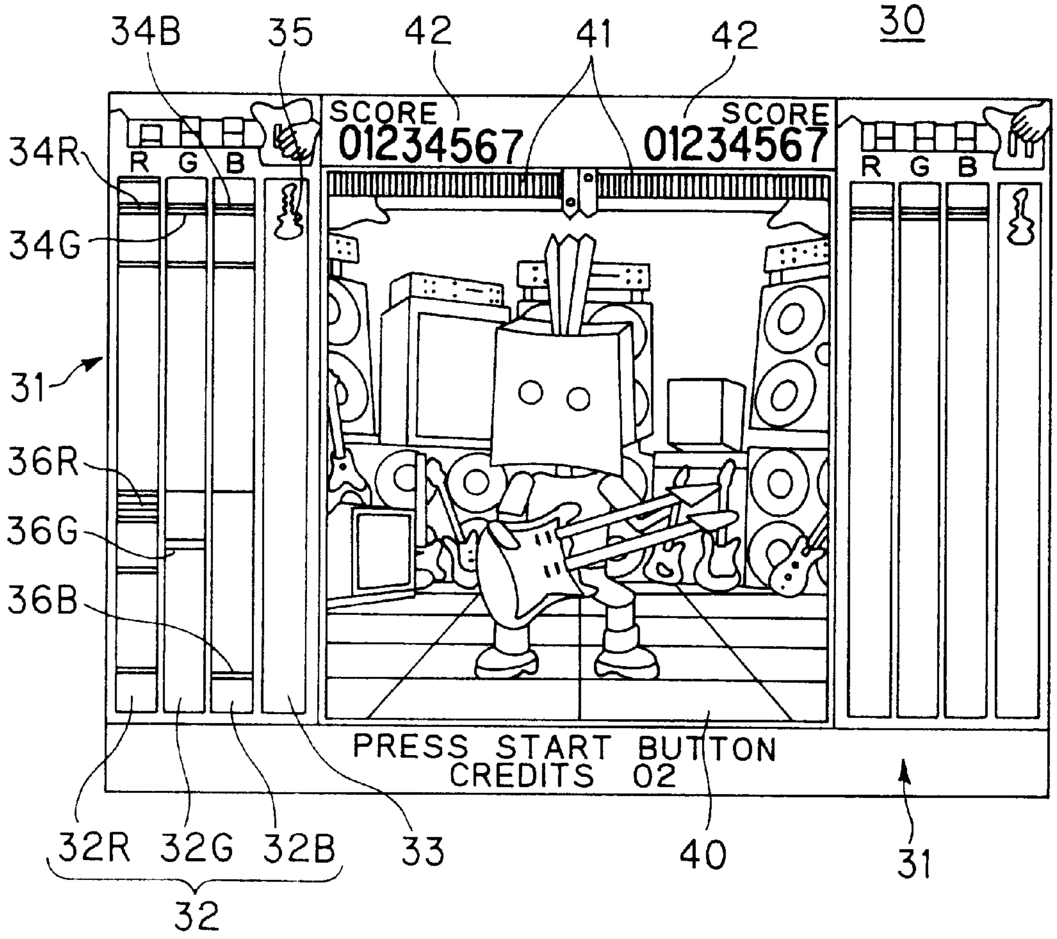
FIG. 4 is a diagram showing one example of a game screen displayed on a monitor in the game system of FIG. 1.

FIG. 4 shows a basic screen of a musical game which is executed in compliance with a program stored in the CD-ROM 15. Indicators 31 and 31 guide the player in manipulating the controller 12 and are displayed at both ends of the game screen 30. The left-side indicator 31 guides a first player, while the right-side indicator 31 guides a second. The constitutions of the indicators 31 are identical. The left-side indicator 31 will be explained in this example. The right-side indicator 31 is not displayed when a single player plays the game.

The indicator 31 comprises a fret manipulation specifying section 32 and a wailing manipulation specification section 33. The fret manipulation specifying section 32 is partitioned into three vertical areas 32R, 32G and 32B. The areas 32R, 32G and 32B correspond respectively to the neck buttons 23R, 23G and 23B of the controller for special use 12B. Horizontal rod-like reference marks 34R, 34G and 34B are displayed in a row above the areas 32R, 32G and 32B, and a guitar-shaped reference mark 35 is displayed at the top end of the wailing manipulation specification section 33. The letters R, G and B are displayed in the areas 32R, 32G and 32B in order to show the relationship between the areas 32R, 32G and 32B and the neck buttons 23R, 23G and 23B. The reference marks 34R, 34G and 34B are colored red, green and blue respectively.

When the controller 12 is manipulated to start the game, the BGM begins and rod-like note marks 36R, 36G and 36B appear in accordance with a predetermined timing at the bottom ends of the areas 32R, 32G and 32B. The note marks 36R, 36G and 36B gradually move upwards as the BGM progresses. By manipulating the picking lever 22 while pressing the neck button 23R corresponding to the area 32R at the moment when the note mark 36R in the area 32R has overlapped with the reference mark 34R, the sound effect allocated to the note mark 36R is superimposed over the BGM. The CPU 1 detects the deviation between the timing at which the picking lever 22 was manipulated and the timing at which the note mark 36R overlapped with the reference mark 34R. The smaller the deviation, the higher the CPU 1 evaluates the player. The reference marks 34G and 34B and the note marks 36G and 36B in the other areas 32G and 32B have a similar relationship with the neck buttons 23G and 23B and the picking lever 22. Hereinafter, the note marks 36R, 36G and 36B will be referred to as the note marks 36 unless there is a need to distinguish among them.

Figure 6:
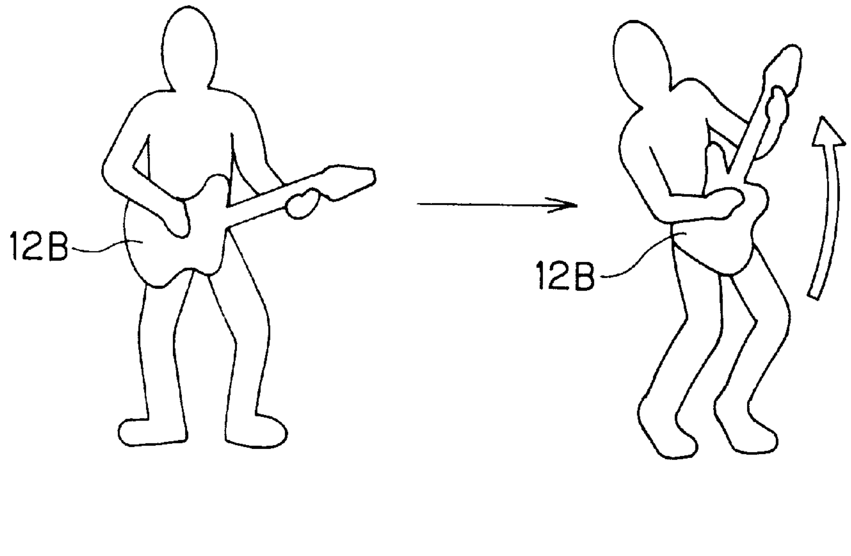
FIG. 6 is a diagram showing a wailing manipulation.
Figure 5:
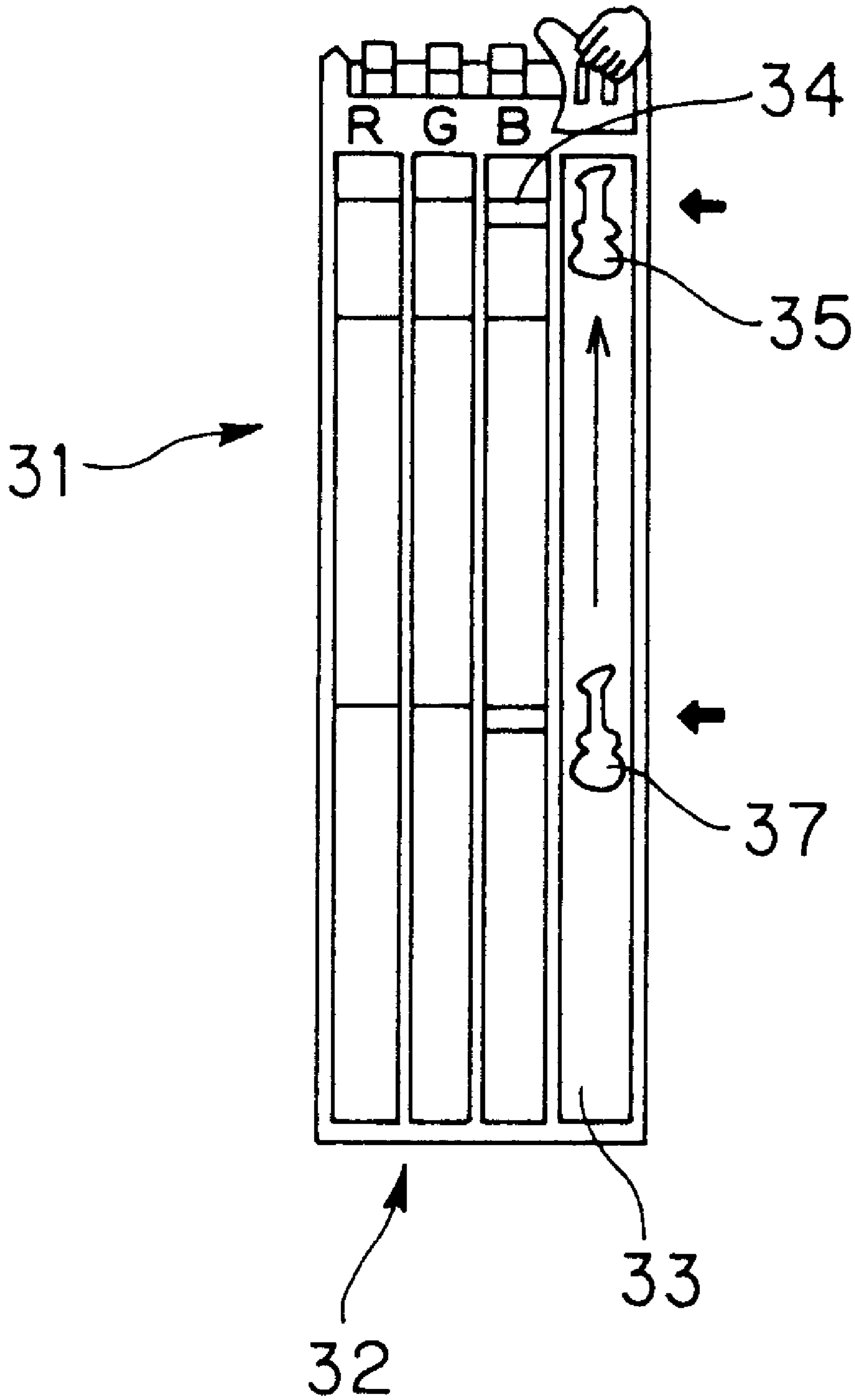
FIG. 5 is a diagram showing a state when a wailing manipulation is specified by an indicator of FIG. 4.

As shown in FIG. 5, a guitar-shaped note mark 37 is displayed in the wailing manipulation specification section 33. The note mark 37 appears at the bottom end of the indicator 31 at the same predetermined timing as the note marks 36, and moves gradually upwards as the musical piece progresses. When the player lifts the controller 12B upright (see FIG. 6) at the moment when the note mark 37 has overlapped with the reference mark 35, the sound effect allocated to the note mark 37 is reproduced. This sound effect imitates the cheer of a crowd. Sound effects representing a guitar being played are allocated to the note marks 36. The pitch and quality of the sounds vary.

Hereinafter, the manipulation of pressing the neck buttons 23R, 23G and 23B will be referred to as fret manipulation, the manipulation of picking the picking lever 22 will be referred to as picking manipulation, and the manipulation of lifting the controller for special use 12B will be referred to as wailing manipulation. Detecting device (not shown in the diagram) such as a gradient sensor or an acceleration sensor is provided in the controller for special use 12B in order to detect the wailing manipulation. The game executed in the present embodiment can be played by using the controller for ordinary use 12A. When playing the game by using the controller for ordinary use 12A, the manipulation members which correspond to the picking lever 22 and the neck buttons 23R, 23G and 23B are selected from the push-button switches PB1 to PB12. The wailing manipulation also corresponds to the manipulation of one of the push-button switches PB1 to PB12.

As shown in FIG. 4, an image display 40 is provided in the center of the game screen 30 and displays animations and the like in time to the musical piece. Moreover, a level gauge 41 and a score display 42 are provided above the image display 40 in correspondence with the indicator 31. The level gauge 41 and the score display 42 are provided in order to show the evaluation of the manipulation carried out by the player. An evaluation of the player's technique is visually displayed according to the length of the level gauge 41 from its left or right side. The higher the evaluation, the greater the length of the level gauge 41. Each player's score is calculated based on the determination of the manipulation timing described above and is displayed in the score display 42.

Figure 7:
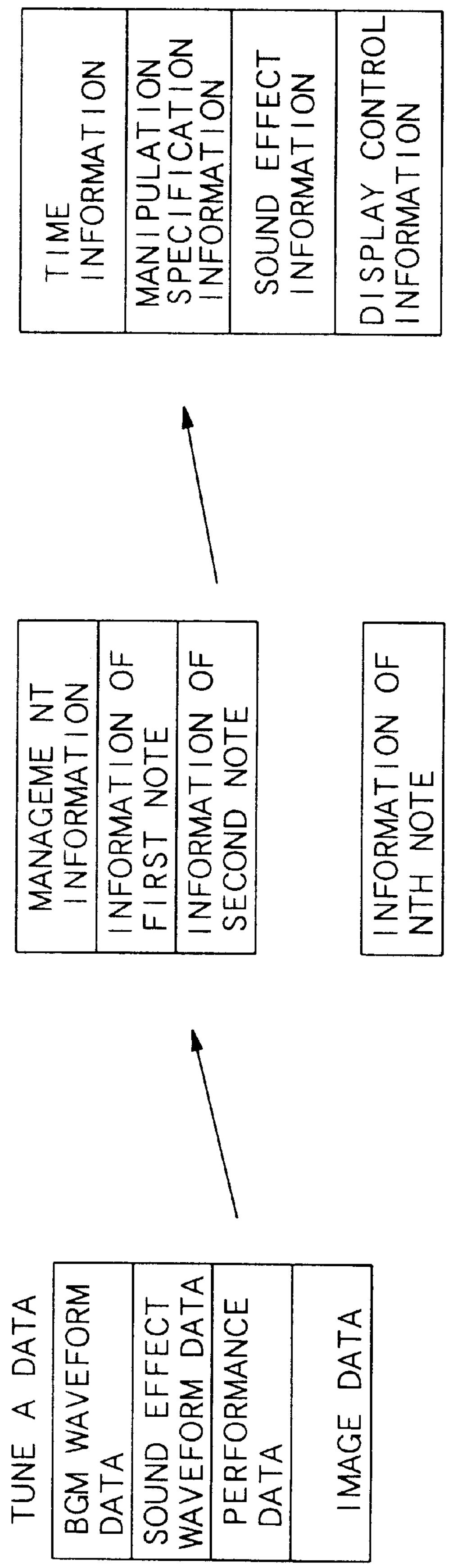
FIG. 7 is a diagram showing the constitution of data relating to a musical piece A which is stored in a CD-ROM of FIG. 1.

FIG. 7 shows a summary of data of a musical piece A stored in the CD-ROM 15 for executing a musical game on the above-described game screen 30. In this game system, multiple musical pieces are prepared beforehand as BGM to be used in the game. The data shown in FIG. 7 is created for each musical piece and stored in the CD-ROM 15.

As is clear from FIG. 7, the data of musical piece A comprises BGM waveform data, sound effect waveform data, performance data, and image data. The BGM waveform data defines a waveform for reproducing the musical piece A. The sound effect waveform data defines a waveform for reproducing sound effects allocated to the note marks 36. The data are created as for example PCM data or ADPCM data, and are stored in the CD-ROM 15. The sound effect waveform data may be provided as separate data for each musical piece or as common data for all musical pieces. Individual management codes are appended to the BGM and sound effect waveform data. A data table containing the management codes in correspondence with the storage positions (sectors) of the waveform data is stored in the CD-ROM 15. In addition to the sound effect waveform data to be allocated to the note marks 36, sound effect waveform data reproduced in correspondence with the above-described wailing manipulation is stored separately in the CD-ROM 15.

The performance data stipulates contents of the manipulations to be specified to the player via the indicator 31, and allocation of the sound effects to be reproduced in correspondence with the manipulations. The image data is needed for displays on the game screen 30.

The performance data comprises management information and information representing a number n of notes. The management information comprises management codes of the BGM waveform data provided in correspondence with the performance data, and information represents numbers and the like of the note marks 36 and 37 to be displayed by the indicator 31 in compliance with the performance data. The BGM waveform data provided in correspondence with the performance data can be identified by consulting the management codes stored in the management information and the table data described above. The management information also comprises information for determining whether the performance data is for solo, twin 1 or twin 2. Data for solo is used when one person plays the game. Twin 1 data and twin 2 data are used when two persons play the game, and correspond to the first person and second person respectively; that is, the twin 1 data corresponds to the indicator 31 on the left side of the game screen 30 and the twin 2 data corresponds to the indicator 31 on the right side of the game screen 30.

The note information is provided in correspondence with the individual manipulations to be specified by the note marks 36R, 36G, 36B and 37 of the indicator 31. The first note information corresponds to the first manipulation to be performed after the performance of the BGM has started, the second note information corresponds to the second manipulation to be performed after the performance of the BGM has started, and so on, the information being created in correspondence with the manipulations which are specified by the individual note marks in chronological sequence.

Each note information further comprises time information, manipulation specification information, sound effect information, and display control information. The time information specifies the timing at which the manipulation specified in the manipulation specification information should be carried out, the timing being specified by the time elapsed from the start of the BGM. The manipulation specification information specifies the content of a manipulation to be carried out at the timing specified by the time information. For example, when specifying fret manipulation and picking manipulation of the neck button 23R at a timing of X minutes and Y seconds from the start .of the BGM, the time of the picking manipulation is specified in the time information, and the neck button 23R is specified in the manipulation specification information. When specifying a wailing manipulation, the timing is similarly specified in the time information and the wailing manipulation is specified in the manipulation specification information.

The elapsed time from the start of the performance may be specified directly in the time information, or information correlating to the elapsed time (e.g. its sector number in the CD-ROM 15) may be specified. In the game of this embodiment, fret manipulation is deemed valid only when picking and fretting manipulations are carried out simultaneously, but the manipulation specification information need only specify either the manipulations of the neck buttons 23R, 23G and 23B or those of wailing. One manipulation specification may specify two or more manipulations. In such a case, multiple note marks are displayed in a row at the same position in the vertical direction of the indicator 31.

The sound effect information specifies the management code of the sound effect waveform to be reproduced in correspondence with the manipulation specified by the manipulation specification information. Moreover, the display control information specifies whether or not to allow the note mark corresponding to the note information to be displayed. Note marks which are not allowed to be displayed by the display control information are not displayed on the indicator 31.

Figure 8:
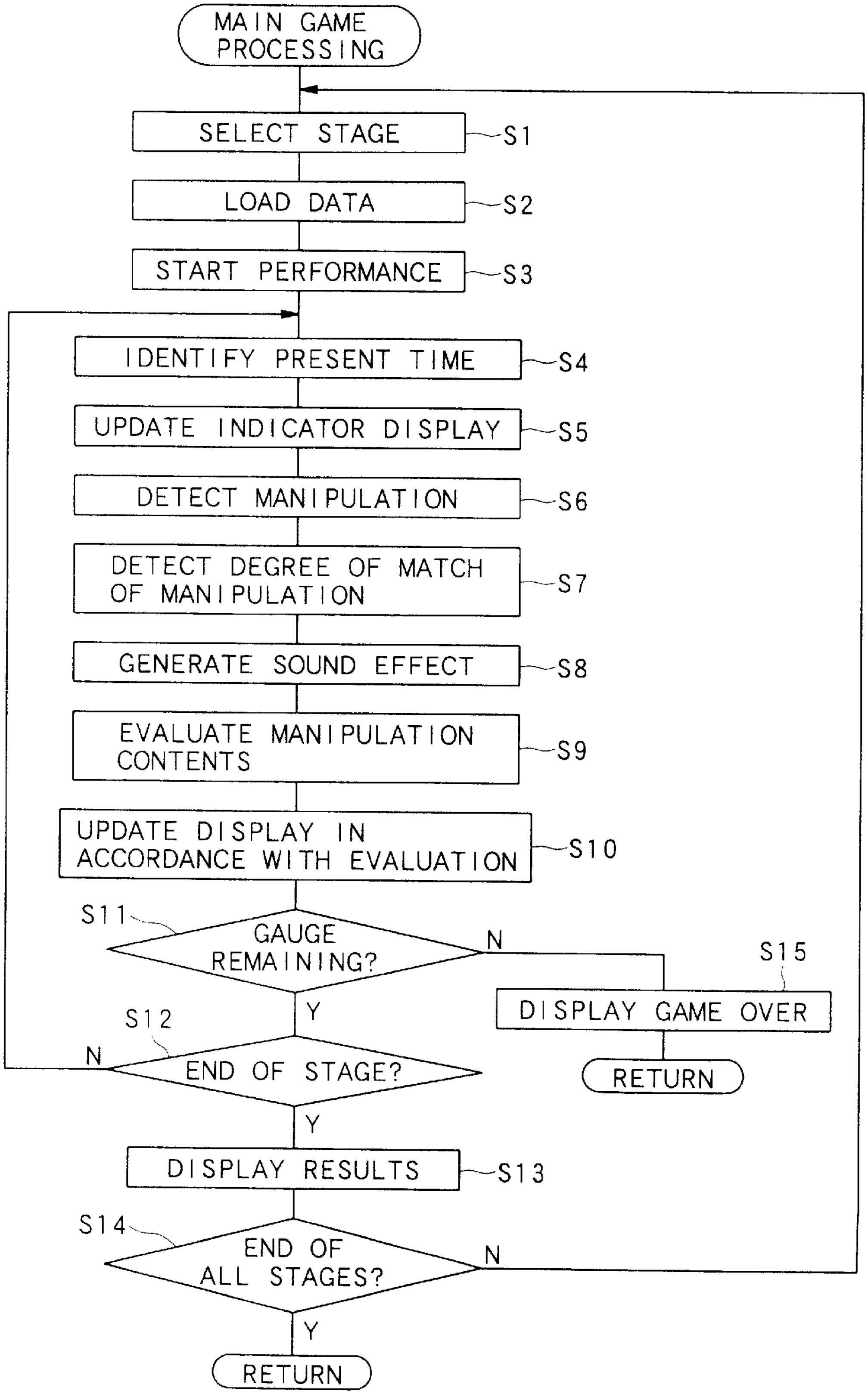
FIG. 8 is a flowchart showing a sequence of main game processes executed by a CPU in the game system of FIG. 1.

FIG. 8 is a flowchart showing a sequence of main game processing executed by the CPU 1 in compliance with a program in the CD-ROM 15. In this processing, one stage is selected from a plurality of stages prepared beforehand in compliance with the player's manipulation of the controller 12 (Step S1). Next, the data needed for executing the selected stage is loaded from the CD-ROM 15 to the RAM 3 (Step S2). When these processes have ended, the BGM waveform data of the musical piece corresponding to the selected stage is determined and the reproduction of this BGM waveform data starts (Step S3). In. other words, the performance of the selected musical piece starts.

Then, the time elapsed from the start of the performance is identified as present time (Step S4). For example, the time elapsed from the start of the performance is determined by consulting the sector number of the BGM waveform data. The display on the indicator 31 is updated based on the present time. For example, this process is carried out in the following way. While consulting the time information of the performance data, all the note information contained in a predetermined display range (e.g. two bars of the musical piece) including the present time is extracted. Then, while consulting the time information and manipulation specification information of the extracted note information, display coordinates are calculated for the note marks 36R, 36G, 36B and 37 corresponding to the note information such that the present time corresponds to the reference marks 34R, 34G, 34B and 35, and the last time within the display range corresponds to the bottom end of the indicator 31. The note marks 36R, 36G, 36B and 37 are displayed at the calculated coordinates. By repeating this process, the note marks 36R, 36G, 36B and 37, which correspond to manipulations to be carried out at a fixed time after the present, appear at the bottom end of the indicator 31 and gradually rise therein until they overlap with the reference marks at the manipulation time.

After the indicator 31 has been updated, a manipulation of the controller 12 within a predetermined period of time is detected (Step S6), and the degree of match between the detected result and the manipulation specified by the performance data is detected (Step S7). For example, in the case where the picking manipulation is detected when the fret manipulation of the neck button 23R has been detected, the nearest note information to the present time among the note information specifying the neck button 23R by the manipulation specification information is consulted, and the amount of deviation between the timing of the picking manipulation defined by that note information and the detected timing of the actual picking manipulation is detected. When either one of the fret manipulation or picking manipulation is detected but the other is not detected within a range which can be regarded as simultaneous thereto, the detected fret or picking manipulation is disregarded. When a wailing manipulation has been detected, the amount of deviation between the detection time and the one of the wailing manipulation times defined in the performance data which is nearest to the present time is detected. When the manipulation defined by the performance data is not detected, the degree of match is deemed to be at its lowest level. The degree of match is also detected between the note marks which are forbidden from being displayed in the indicator 31 by the display control information of FIG. 7 and the manipulations corresponding thereto.

In a subsequent step S8, the sound effect corresponding to the manipulation which was detected in Step S7 is reproduced. In this case, after the sound effect information of the performance data is consulted, sound effect waveform which is allocated to the manipulation having the highest degree of match among the manipulations which were actually detected is specified and sent to the SPU 6 (see FIG. 1).

After the sound effect has been reproduced, the player's manipulation is evaluated based on the degree of match detected in Step S7 (Step S9). The gauge amount of the level gauge 41 and the score of the score display 42 are calculated in accordance with the evaluation result and their displays are updated (Step S10). It is then determined whether any gauge amount of the level gauge 41 remains (Step S11). If the gauge amount remains, it is determined whether play has proceeded as far as the end of the stage (Step S12). When play has not reached the end of the stage, processing returns to Step S4. When it is determined in Step S11 that the gauge amount does not remain, "GAME OVER" is displayed and the main game ends. When it is determined in Step S12 that the end of the stage has been reached, that stage is cleared and the result of that stage is calculated and displayed (Step S13). Thereafter, it is determined whether all stages have been cleared (Step S14). When unplayed stages still remain, the processing returns to Step S1; when all stages have ended, the processing of the main game ends.

In the game system described above, since the game proceeds based mainly on the musical script (the group of note marks 36 and 37) displayed on the indicator 31, the player inevitably desires to change the contents of the display to suit his or her tastes. Accordingly, the present embodiment comprises an edit function which enables the player to edit the performance data (used when creating specifications and when changing existing performance data). Various processes for realizing the edit function will be explained with reference to FIGS. 9 to 25.

FIGS. 9 to 13 are flowcharts showing various sequences of edit-related processes which are executed by the CPU 1, and FIGS. 14 to 22 respectively show examples of screens displayed on the monitor 9 in the processes. In the following explanation it is assumed that the controller for ordinary use 12A is used, but it is of course possible to perform the editing processes using the controller for special use 12B.

Figure 14:
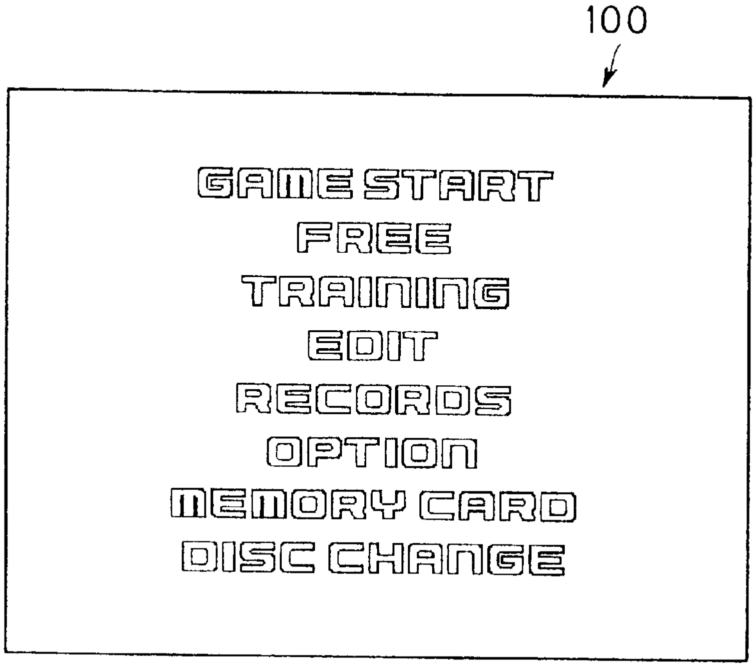
FIG. 14 is a diagram showing a menu screen which is first displayed when game start has been specified in the game system of FIG. 1.

FIG. 14 shows a menu screen 100 which is displayed on the monitor 9 when the start of the game is specified during the execution of a program in the CD-ROM 15. A menu of selectable operations listed from top to bottom is displayed on the menu screen 100. When "GAME START" is selected, the main game processing shown above in FIG. 8 commences. The game is executed by the same sequence when "FREE" is selected, but in this case, instead of selecting a stage the player can play the game after selecting a musical piece of his or her own choice from the musical pieces stored in the CD-ROM 15. When "EDIT" is selected, the processing of FIG. 9 commences.

Figure 9:
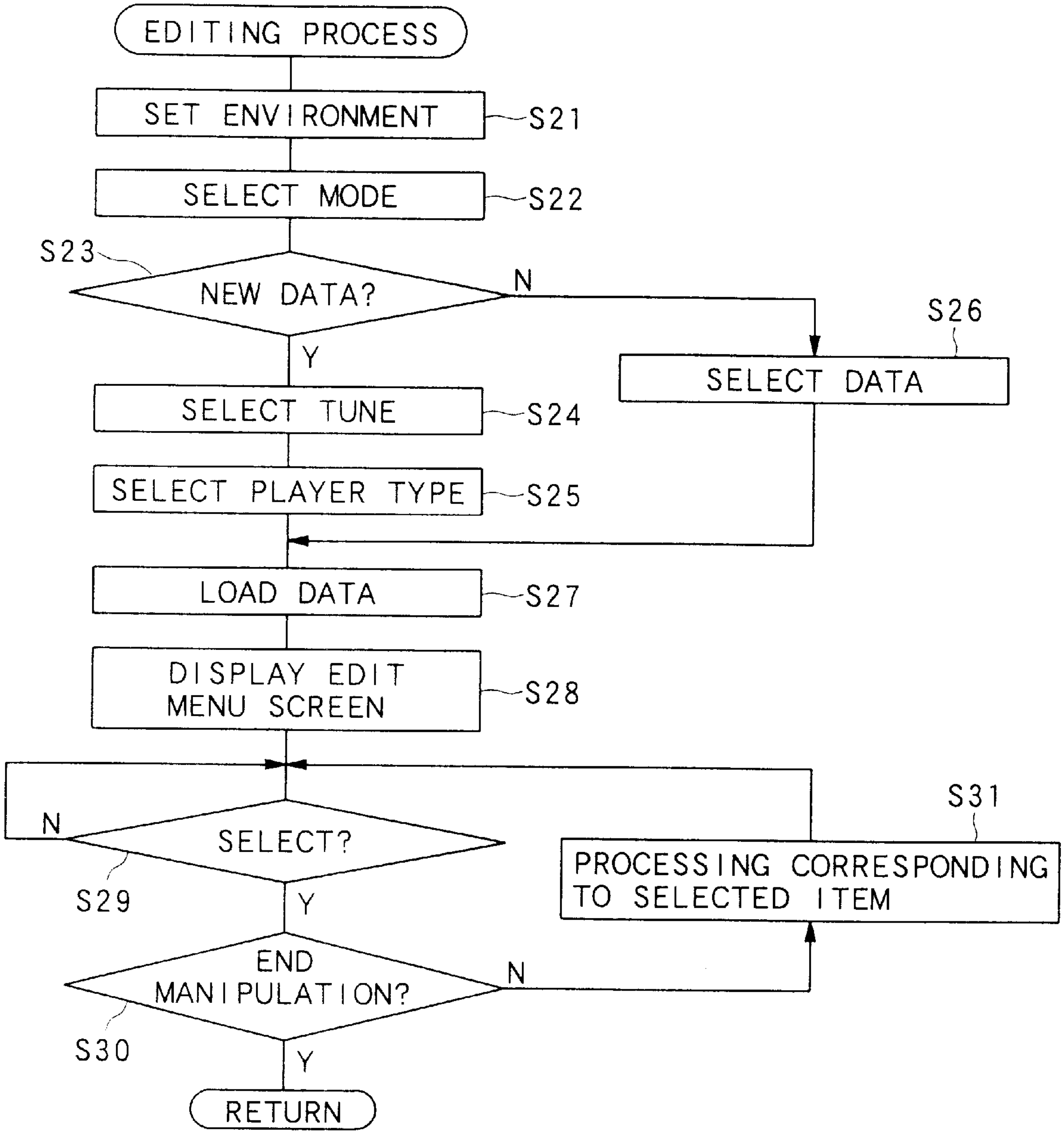
FIG. 9 is a flowchart showing a sequence of editing processes executed by the CPU during editing the performance data in the game system of FIG. 1.
Figure 15:
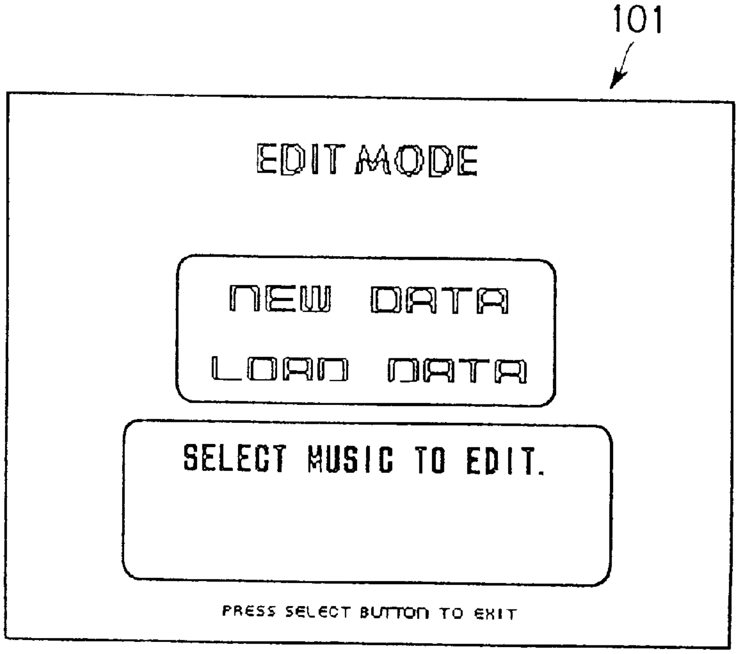
FIG. 15 is a diagram showing an example of a mode selection screen displayed when "EDIT" has been selected from the menu screen of FIG. 14.

In the processing of FIG. 9, an environment needed to perform editing is set up by loading predetermined data from the CD-ROM 15 to the RAM 3, and the like (Step S21). Then, a process to select edit mode is carried out based on a command supplied by the player using the controller 12 (Step S22). In this process, the mode selection screen 101 shown in FIG. 15 is displayed, and "NEW DATA" or "LOAD DATA" is selected in compliance with a command supplied by the player using the controller 12. When "NEW DATA" has been selected, a mode for creating new performance data commences based on the performance data (see FIG. 7) stored in the CD-ROM 15. When "LOAD DATA" has been selected, the performance data stored in the auxiliary memory apparatus 13 is loaded to the RAM 3 and a mode for editing this data commences. The performance data stored in the auxiliary memory apparatus 13 is the data created by using the edit function.

In the following Step S23, it is determined whether the mode for creating new performance data has been selected. When it has been determined that the mode for creating new performance data has been selected, processing is carried out to select the musical piece for which performance data is to be created from the CD-ROM 15 based on a command supplied by the player using the controller 12 (step S24). Thereafter, a process is carried out to select a player type of the new performance data from "solo" (for one player) and "twin" (for two players) (Step S25). When editing of the performance data stored in the auxiliary memory apparatus 13 has been selected in Step S23, a process is carried out to select the data to be edited from the performance data stored in the auxiliary memory apparatus 13 based on a command supplied by the player using the controller 12 (Step S26).

After the processes of Steps S25 and S26, the selected performance data is loaded to the RAM 3 (Step S27). In the mode for creating new performance data, performance data which satisfies the conditions stipulated by Steps S24 and S25 is loaded from the CD-ROM 15 to the RAM 3. On the other hand, in the mode for editing performance data which has already been created, the performance data selected in Step S26 is loaded from the auxiliary memory apparatus 13 to the RAM 3.

Figure 16:
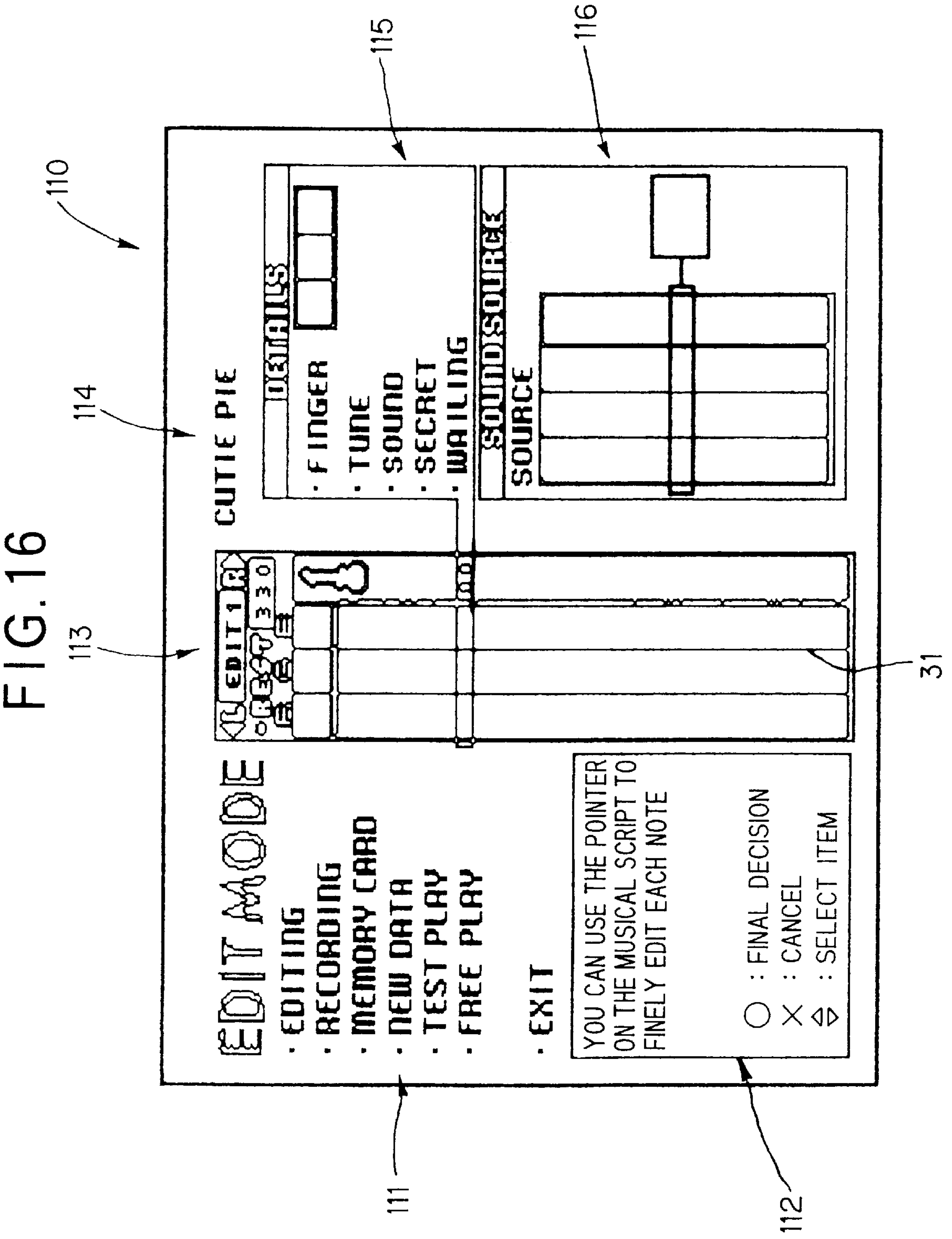
FIG. 16 is a diagram showing an example of an edit menu screen displayed when executing the editing process of FIG. 9.

The edit menu screen 110 shown in FIG. 16 is then displayed (Step S28). The edit menu screen 110 comprises a menu display 111 which displays selectable items, a guide display 112 which displays a guide to manipulation relating to the item selected in the menu display 111, a musical script display 113 which displays the indicator 31 corresponding to the performance data to be edited, a musical piece display 114, a detailed menu display 115, and a sound source display 116. In the guide display 112, the push-button switches of the controller for ordinary use 12A are displayed in correspondence with the functions which are realised when these switches are manipulated. In the example shown in FIG. 16, the selectable items displayed in the menu display section 111 can be changed by manipulating the vertical push-button switches PB1 and PB2 of the controller for ordinary use 12A. By pushing the ○ button PB8, confirmation of the item selected at that point can be obtained from the display in the guide display 112.

When the edit menu screen 110 is displayed, the processing proceeds to Step S29 of FIG. 9. In Step 29, it is determined whether the player has manipulated the controller 12 to select one of the items from the menu display 111. The selectable items are prepared as "EDITING", "RECORDING", "MEMORY CARD", "NEW DATA", "TEST PLAY", "FREE PLAY" and "EXIT". When one of these items is selected, it is determined whether the player has selected "EXIT" to end the editing process (Step S30). When "EXIT" has not been selected, processing for the other selectable items is carried out and the processing returns to Step S29. When it is determined in Step S30 that the player has ended the editing, the process of FIG. 9 ends and the menu screen 100 of FIG. 14 is displayed.

Figure 10:
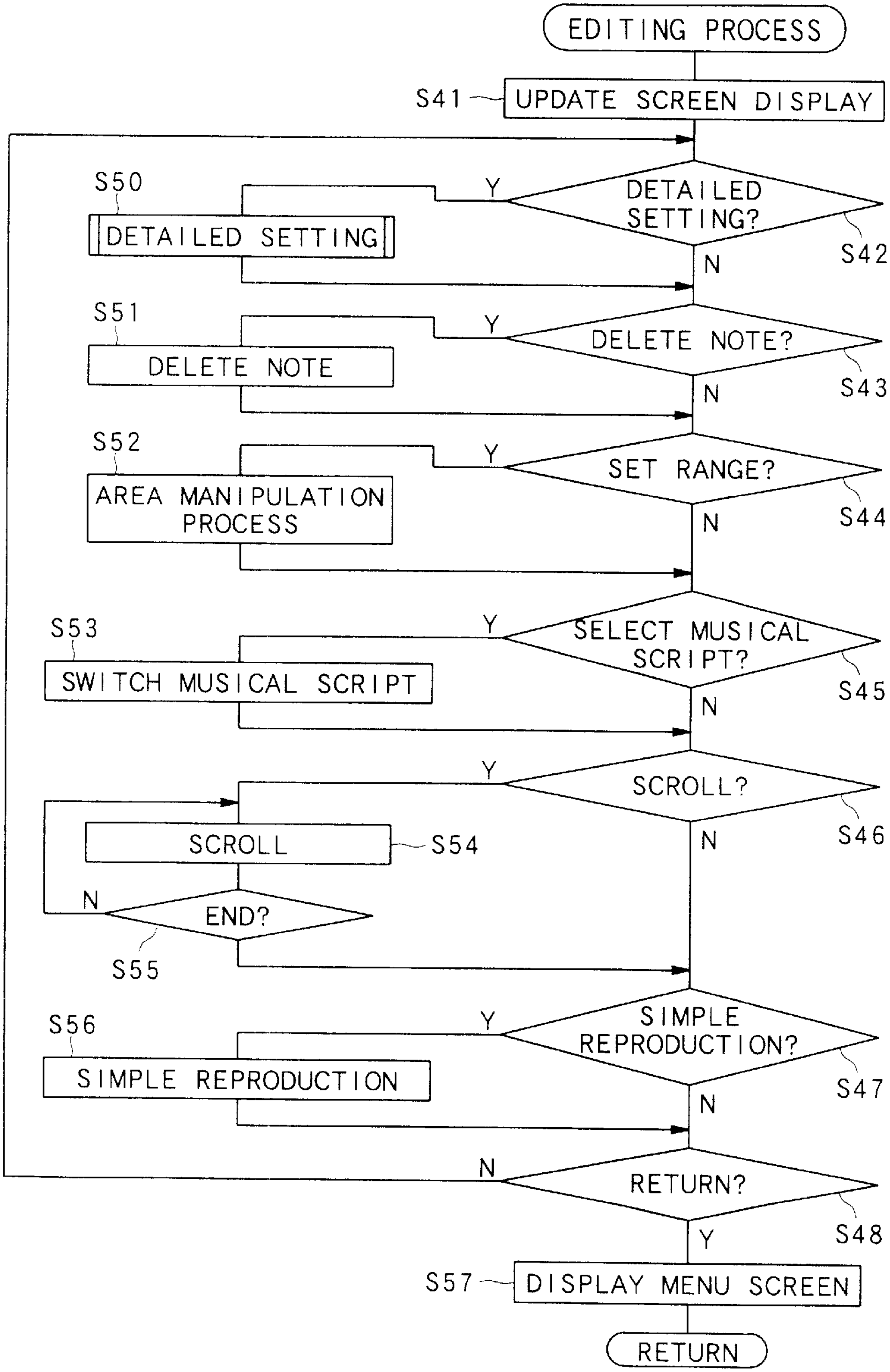
FIG. 10 is a flowchart showing a sequence of edit processes executed as a subroutine in the processing of FIG. 9.

In the case where "EDITING" has been selected from the edit menu screen 110 of FIG. 16, the editing shown in FIG. 10 is carried out. During editing, the note information stipulated by the performance data is individually selected and the player changes them as he or she wishes.

Figure 17:
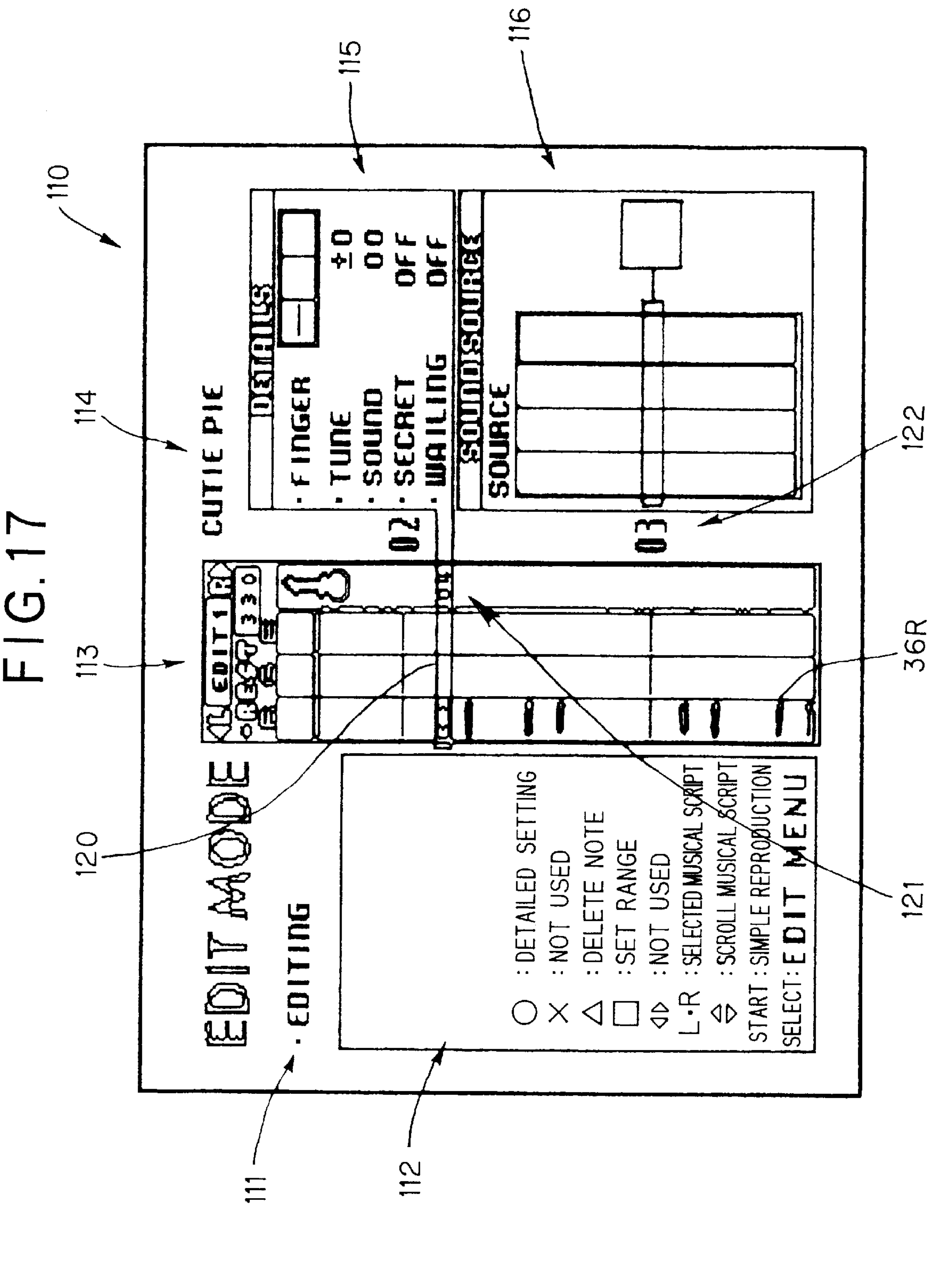
FIG. 17 is a diagram showing an example of a screen displayed when executing the editing process of FIG. 10.

When the editing commences, the display of the edit menu screen 110 is updated as shown in FIG. 17 (Step S41).

During updating, the displays of the menu display 111 and the guide display 112 are changed so as to correspond to the editing. Note marks 36R, 36G, 36B and 37 from the musical score stipulated by the performance data loaded to the RAM 3 in Step S27 of FIG. 9 which are included in a predetermined range (e.g. two bars of the musical piece) are displayed in the indicator 31 of the musical script display 113. FIG. 17 shows only the note mark 36R. The edit bar 120 is superimposed over the display of the indicator 31, and note position information 121 showing which beat the note mark captured in the edit bar 120 corresponds to (counting from the head of the bar when the bar containing the note is divided into thirty-two beats) is displayed in the edit bar 120. For example, a display of "04" represents the fourth beat of the bar. Moreover, bar information 122 shows which bar of the musical piece the edit bar 120 is positioned in, and is displayed outside the column on the right side of the indicator 31. For example, "03" represents the third bar from the start of the musical piece.

Thereafter, it is determined whether the player has manipulated the controller for ordinary use 12A to specify detailed setting, note deletion, range specification, musical script selection, scrolling, simple reproduction, and return to the initial edit menu screen 110 (Steps S42 to S48). When the player has specified detailed setting, a detailed setting process is carried out (Step S50). This will be explained later. When note deletion has been selected, the note marks enclosed by the edit bar 120 at that point are deleted from the indicator 31 and the performance data being edited is updated to reflect this deletion (Step S51).

When range specification has been selected, a predetermined area manipulation is carried out (Step S52). The area manipulation process makes it possible to efficiently carry out editing operatons such as, for example, simultaneously deleting all note marks contained within a specific range of the indicator 31, shifting the note marks to another position, and copying them. When musical script selection has been specified, processing is carried out to switch the musical script displayed in the indicator 31 to/from the musical script based on the performance data for twin 1 from/to the musical script based on the performance data for twin 2 (Step S53). The musical script selection manipulation is ignored when editing the performance data for solo. When the player selects scrolling, the musical scripts displayed in the indicator 31 are scrolled in a direction in correspondence with the player's scrolling manipulation (Step S54). Scrolling continues until the scrolling manipulation ends (Step S55). The minimum scrolling unit is set to a length of 1/32 of a bar, for example. Consequently, the arrangement and deletion of the note marks 36 and 37 can be edited in units of 1/32 of a bar.

When simple reproduction has been selected, a simple reproduction process is carried out (Step S56). In this process, the display of the indicator 31 is controlled in the same way as in Step S5 of FIG. 8, based on performance data being edited which are located in a fixed range ahead and behind the position of the edit bar 120 (e.g. three bars ahead and behind). This enables the player to know the situation when the performance data being edited is actually played. When return to the initial edit menu screen 110 has been specified, the edit menu screen 110 of FIG. 16 is displayed (Step S57) and the edit processing of FIG. 10 ends.

Figure 11:
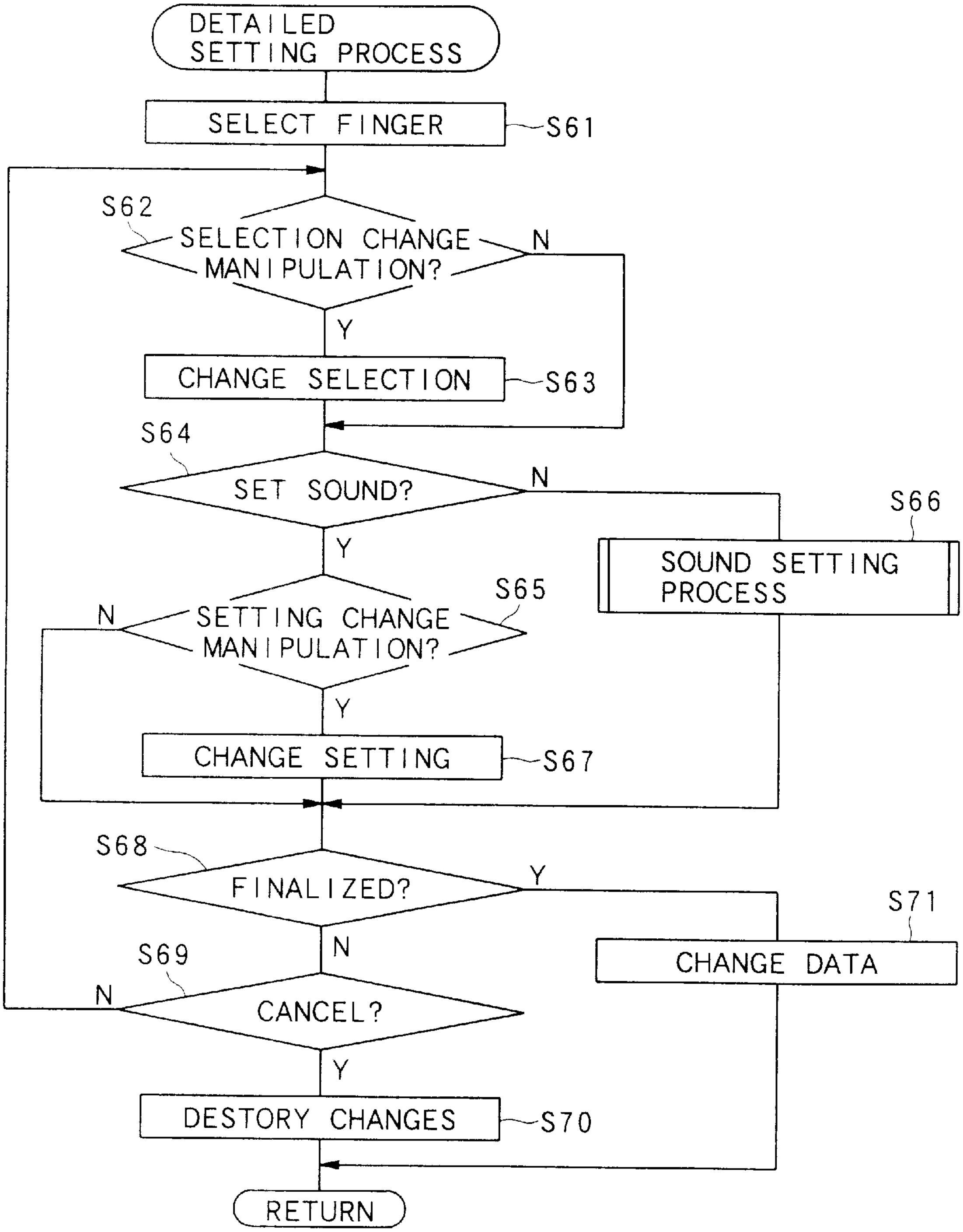
FIG. 11 is a flowchart showing a sequence of detailed setting processes executed as a subroutine of the processing of FIG. 10.

FIG. 11 is a flowchart showing a sequence of detailed setting processes (Step S50) executed as a subroutine of FIG. 10. In the detailed setting processing, one item is selected from "FINGER", "TUNE", "SOUND", "SECRET", and "WAILING" which are displayed in the detailed menu display 115, and the setting corresponding to the selected item can be changed.

At the start of the detailed setting processing, "FINGER" is set as the initial item to be selected (Step S61) and it is determined whether a manipulation has been carried out to change the item to be selected (Step S62). When a change manipulation has been carried out, the item to be selected is changed in correspondence therewith (Step S63), and thereafter the processing proceeds to Step S64. In Step S64, it is determined whether the item presently selected is "SOUND", and if not, it is determined whether a setting change manipulation has been carried out with respect to the presently selected item (Step S65). When the setting change manipulation has been carried out, the setting of the selected item is changed in correspondence with the manipulation (Step S67).

Figure 18:
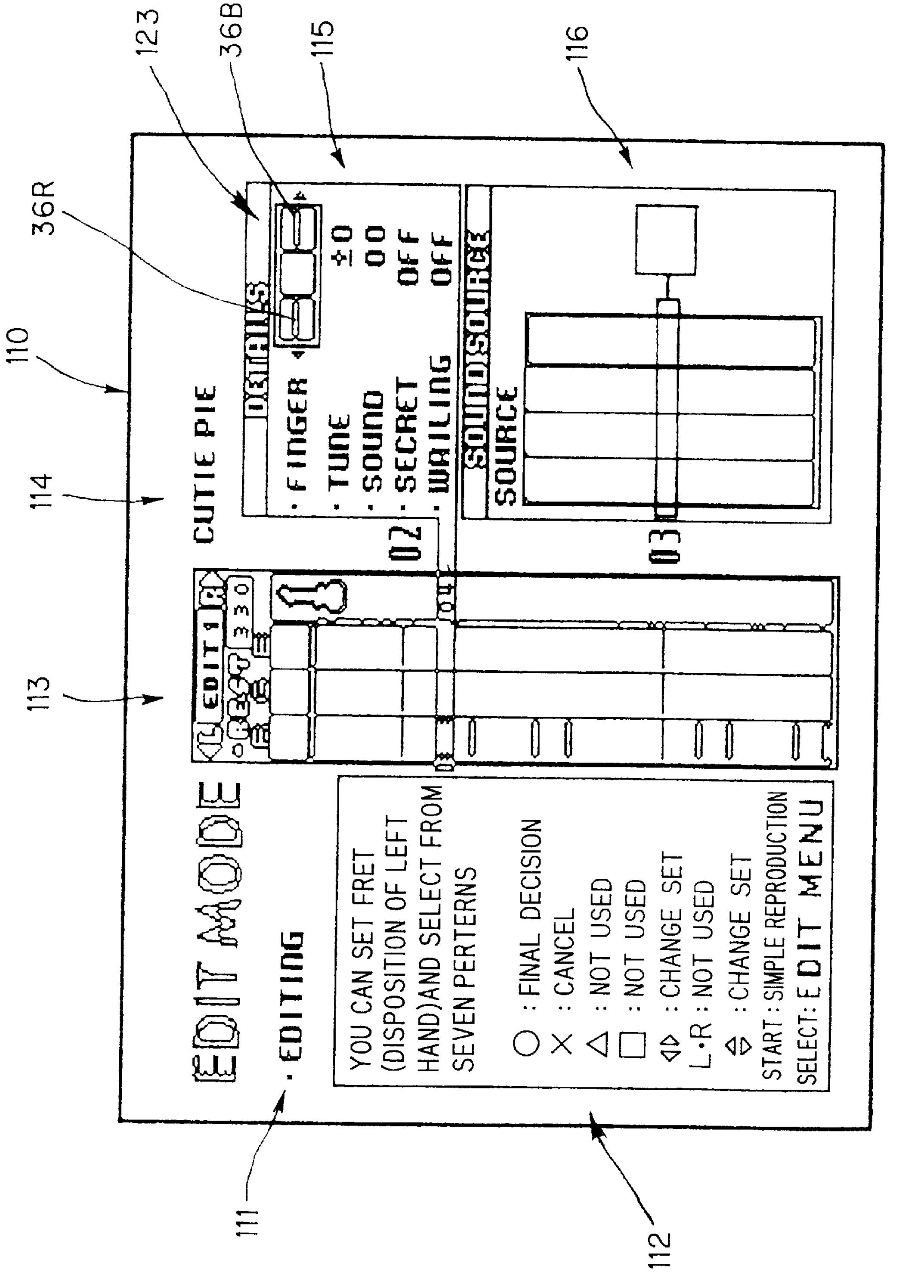
FIG. 18 is a diagram showing an example of a screen displayed when executing the detailed setting processing of FIG. 11.

A case where the setting is changed when "FINGER" has been selected will be explained with reference to FIG. 18. When the push-button switches PB3 and PB4 of the controller 12A are pressed while "FINGER" is selected, the note marks displayed in the fret indicator 123 of the detailed menu display 115 are cyclically changed in the sequence 36R→36G→36B→36R+36G→36R+36B→36G+36B→36R+36G+36B in correspondence with the number of time the push-button switches are pressed. FIG. 18 shows the state when the note marks 36R and 36B are displayed.

When the player carries out a predetermined decisive manipulation by using the controller 12A (Step S68), the display of the note marks 36 in the edit bar 120 of the indicator 31 is changed to be identical with the display of the note marks 36 in the fret indicator 123, and the performance data being edited is updated to reflect this change (Step S71). As a consequence, it is possible to carry out operations such as for example changing the note mark 36R in the area 32R shown in FIG. 23 to the note mark 36B of another area 32B. That is, this operation does not change the manipulation time of the picking lever 22 specified by the time information of the performance data of FIG. 7, but changes the specifications of the neck buttons 23R, 23G and 23B which are to be manipulated in synchronism with the picking manipulation. In other words, the information specified by the manipulation specification information can be changed. When the above manipulation is carried out while no note marks 36 are being displayed in the edit bar 120, new note marks 36 are displayed in the edit bar 120. In this case, a new timing is added for the picking manipulation.

Figure 24:
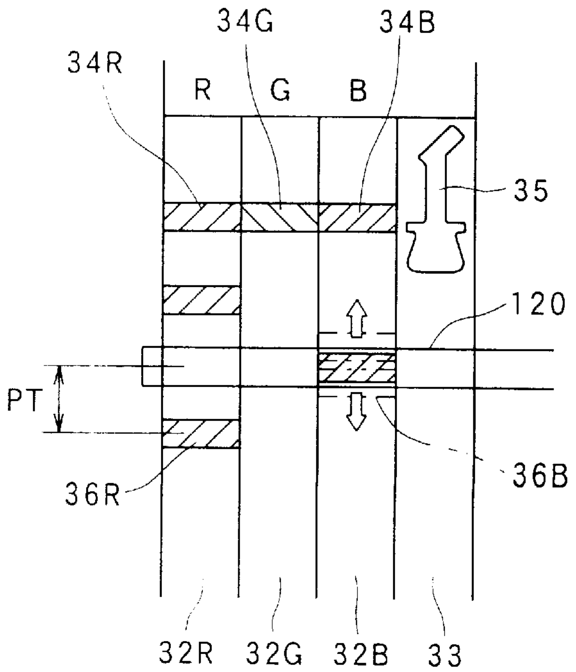
FIG. 24 is a diagram showing an example of an indicator display when the position of a note mark is adjusted parallel to its time axis in the editing process of FIG. 10.
Figure 25:
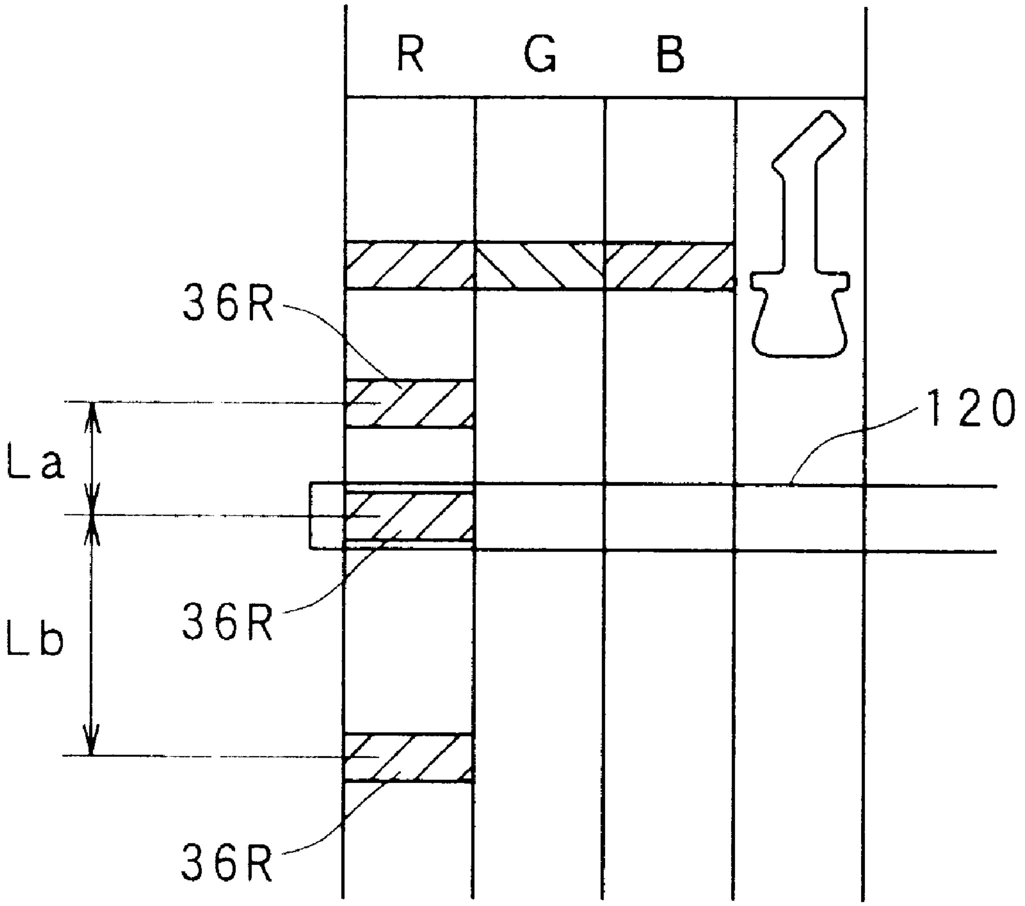
FIG. 25 is a diagram showing processing when automatically allocating a sound effect in the recording process of FIG. 13.

The following setting changes are executed in Step S67 when "TUNE", "SECRET" or "WAILING" is selected from the detailed menu display 115. When "TUNE" is selected, the time in the time information corresponding to the note marks 36 in the edit bar 120 is minutely adjusted in correspondence with a setting adjustment manipulation of the controller for ordinary use 12A. Consequently the position of, for example, the note mark 36B specified in the edit bar 120 is minutely adjusted upwards or downwards as shown in FIG. 24. The unit of adjustment here is set to be equal to the resolution (the time length of one sector) of the BGM waveform stored in the CD-ROM 15, and is for example 1/75 second. Since the minimum unit PT of the scrolling in Step S54 of FIG. 10 is set to a length of for example 1/32 of a bar, the timing of the picking manipulation can be very finely adjusted.

When "SECRET" is selected, the display control information (see FIG. 7) corresponding to the note marks 36 in the edit bar 120 are switched between display-allowed and display-prohibited in correspondence with a predetermined switch manipulation of the controller 12A. When "WAILING" is selected, the note mark 37 is switched to and from a specified position in the edit bar 120 in correspondence with a predetermined setting change manipulation of the controller 12A.

When the processes of Steps S66 and S67 of FIG. 11 are completed, or when a negative result was determined in Step S66, processing proceeds to Step S68. In Step S68 it is determined whether the edit contents can be finalized based on a command from the player via the controller 12A.

When no finalizing manipulation is executed in Step S68, it is determined whether the player has cancelled the setting change by manipulating the controller 12A (Step S69). When there is no cancel manipulation, processing returns to Step S62. When a cancel manipulation has been carried out, the setting changes up to that point are destroyed (Step S70). Thereafter, the detailed setting process is cancelled and processing proceeds to Step S43 of FIG. 10.

When it has been determined that "SOUND" is selected in Step S64, a subroutine for setting sound is performed (Step S66) and when this ends, the processing proceeds to Step S68.

Figure 12:
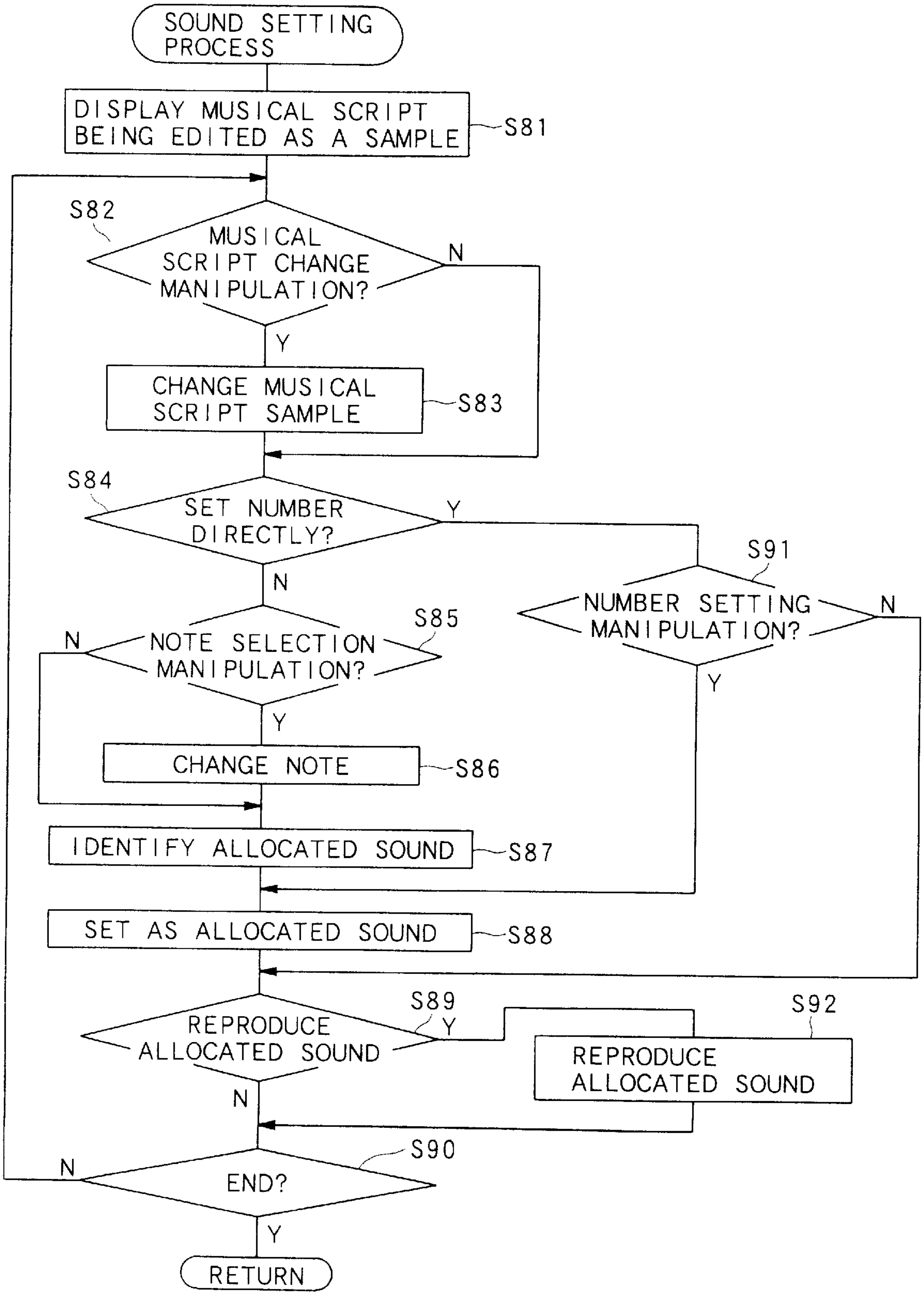
FIG. 12 is a flowchart showing a sequence of sound setting processes executed as a subroutine of the processing of FIG. 11.
Figure 19:
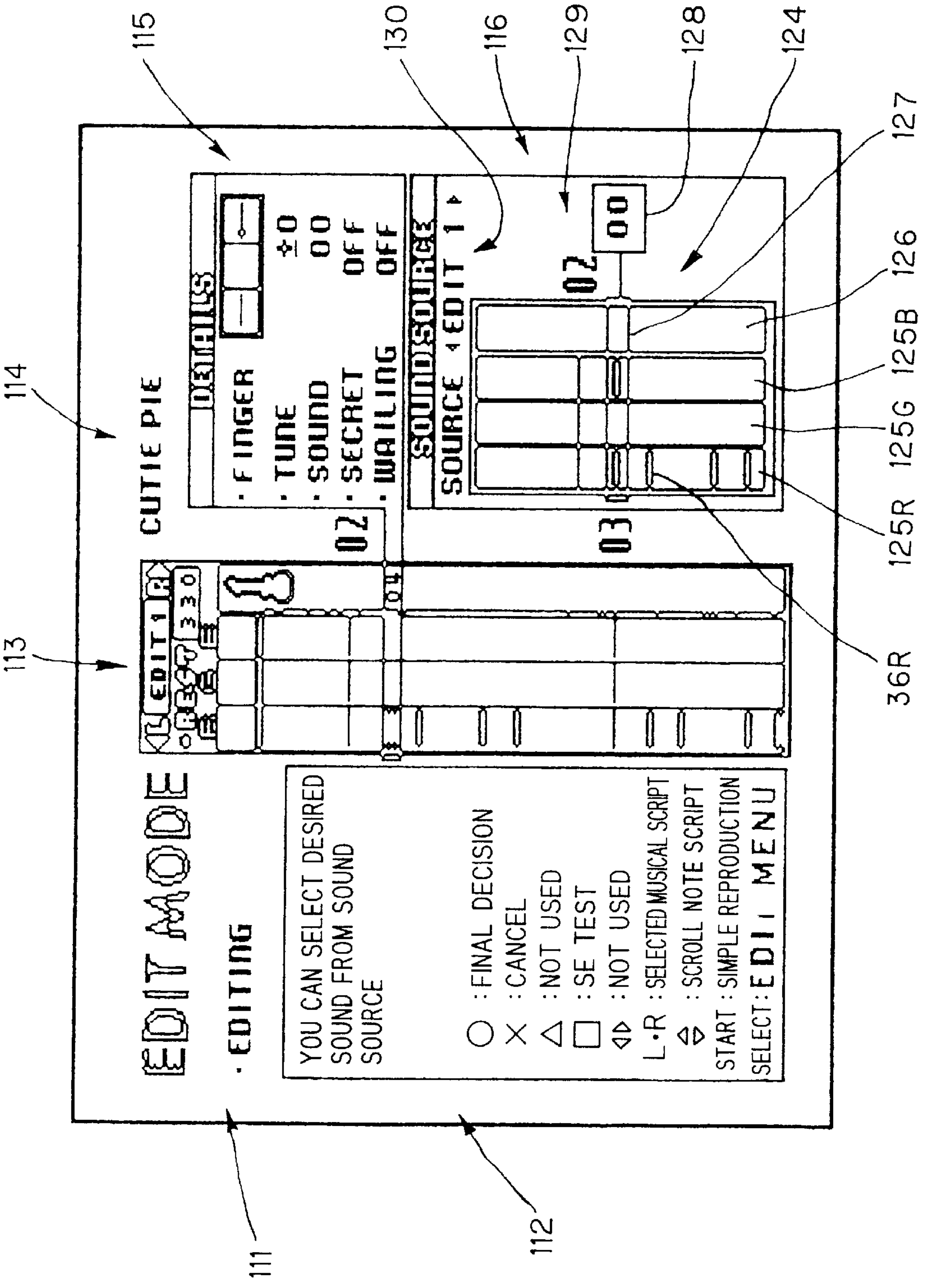
FIG. 19 is a diagram showing an example of a screen displayed when executing the sound setting processing of FIG. 12.

FIG. 12 shows the sound setting process in detail. When the sound setting process starts, the musical script corresponding to the performance data being edited is displayed in a sample indicator 124 (see FIG. 19) provided in the sound source display 116 (Step S81). As is clear from the example of FIG. 19, areas 125R, 215G and 125B, which are allocated to the neck buttons 23R, 23G and 23B similar to those in the indicator 31, and an area 126 which is allocated to the wailing manipulation are provided in the sample indicator 124. The note marks 36 in compliance with the performance data selected as a sample are displayed in the areas 125R, 215G and 125B, and the note mark 37 in compliance with the performance data is displayed in the area 126.

A selection bar 127 is displayed overlapping the sample gauge 124, and a number display bar 128 is provided to the right thereof. A management code of the sound effect waveform which is allocated to the note mark in the selection bar 127 is displayed in the number display bar 128. In the example shown in FIG. 19, a two-digit numerical value of "00" is displayed. A phrase information 129 is displayed outside the right column of the sample gauge 124 in the same manner as the music script display 113. Information 130 representing the type of performance data which is selected as the sample is displayed at the top of the sound phrase display 116. "EDIT 1" is displayed in this example, showing that the performance data for twin 1 presently being edited is selected as the sample data. In addition, performance data being edited for solo and twin 2, original performance data (performance data stored beforehand in the CD-ROM 15) for solo, twin 1 and twin 2 can be selected as the sample data.

When the sample music script is displayed on the sample indicator 124, the processing proceeds to Step S82 of FIG. 12. In Step S82, it is determined whether the player has carried out a predetermined manipulation to the controller 12A to change the music script. When the player has carried out the predetermined manipulation, the sample performance data to be displayed in the sample indicator 124 are changed in the above-described selection (Step S83). The selection also includes a mode in which the management code of the sound effect waveform data can be specified directly without using sample data. In a subsequent step S84 it is determined whether the mode for directly specifying the management code has been selected. When it has not been selected, it is determined whether the controller 12A has been manipulated to selected a note (Step S85), and if so, the note is changed in correspondence with that manipulation (Step S86). Specifically, the musical script displayed in the sample indicator 124 is scrolled up and down in correspondence with the manipulation of the controller 12A, and the note marks captured in the selection bar 127 are changed.

The sound effect information (see FIG. 7) of the performance data selected as the sample is consulted, and the management code of the sound effect allocated to the note mark captured in the selection bar 127 is identified and displayed in the number display bar 128 (Step S87). Then, the sound effect corresponding to the management code displayed in the number display bar 128 is set as the sound effect allocated to the note mark captured in the edit bar 120 of the musical script display 113 (Step S88). It is then determined whether the controller 12A has been manipulated so as to reproduce the allocated sound effect (Step S89). When the result of Step S89 is affirmative, the sound effect corresponding to the management code displayed in the number display bar 128 is reproduced (Step S92). Thereafter, it is determined whether the controller 12A has been manipulated so as to end the sound setting process (Step S90). When there has been no such manipulation, the processing returns to Step S82. Therefore, when the player does not like the sound effect, he or she needs only to scroll through the musical scripts in the sample indicator 124 and capture the note mark allocated to the sound effect of his or her choice in the selection bar 127.

When it has been determined in Step S84 that the mode for directly setting the management code is selected, the processing proceeds to Step S91 in which it is determined whether the controller 12A has been manipulated so as to specify a number (management code). When a number has been specified, the processing proceeds to Step S88 and that number is allocated as the sound effect. When no number is specified in Step S91, the processing proceeds to Step S89.

Figure 13:
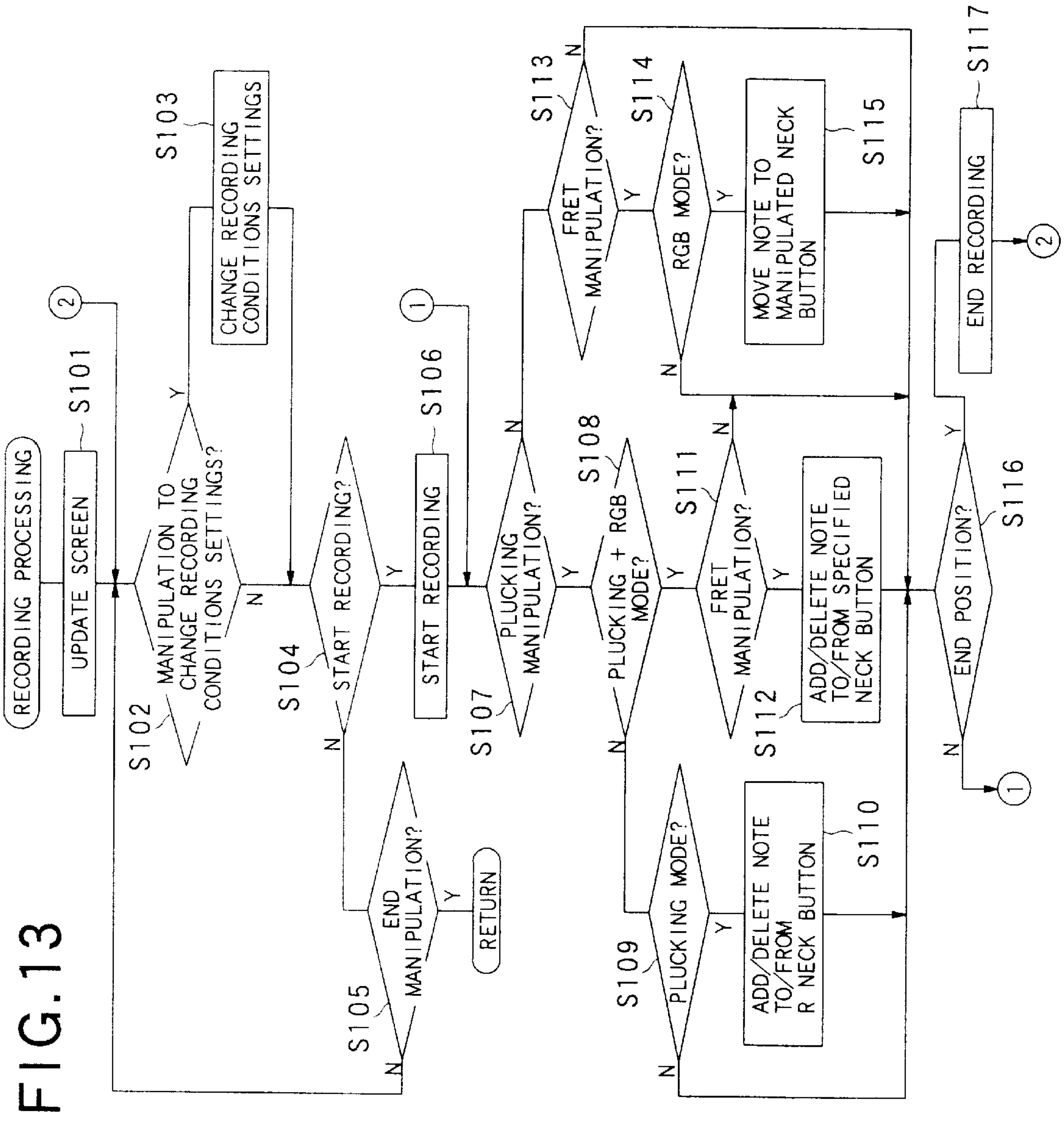
FIG. 13 is a flowchart showing a sequence of recording processes executed as a subroutine of the processing of FIG. 9.

When "RECORDING" has been selected from the menu display 111 of the edit menu screen 110 in FIG. 16, the CPU 1 starts the recording processing shown in FIG. 13. In this recording processing, the musical script to be edited is displayed in the indicator 31 displayed in the musical script display 113 and is scrolled in a predetermined speed. The note marks are recorded in the indicator 31 in correspondence with a series of manipulations of the controller 12A which are carried out while scrolling, and the performance data is created based on the recorded note marks. In carrying out the recording processing, the player is able to select either a write-over mode for writing newly input performance data over the existing performance data, or an add mode for adding newly input note marks to the existing performance data.

Figure 20:
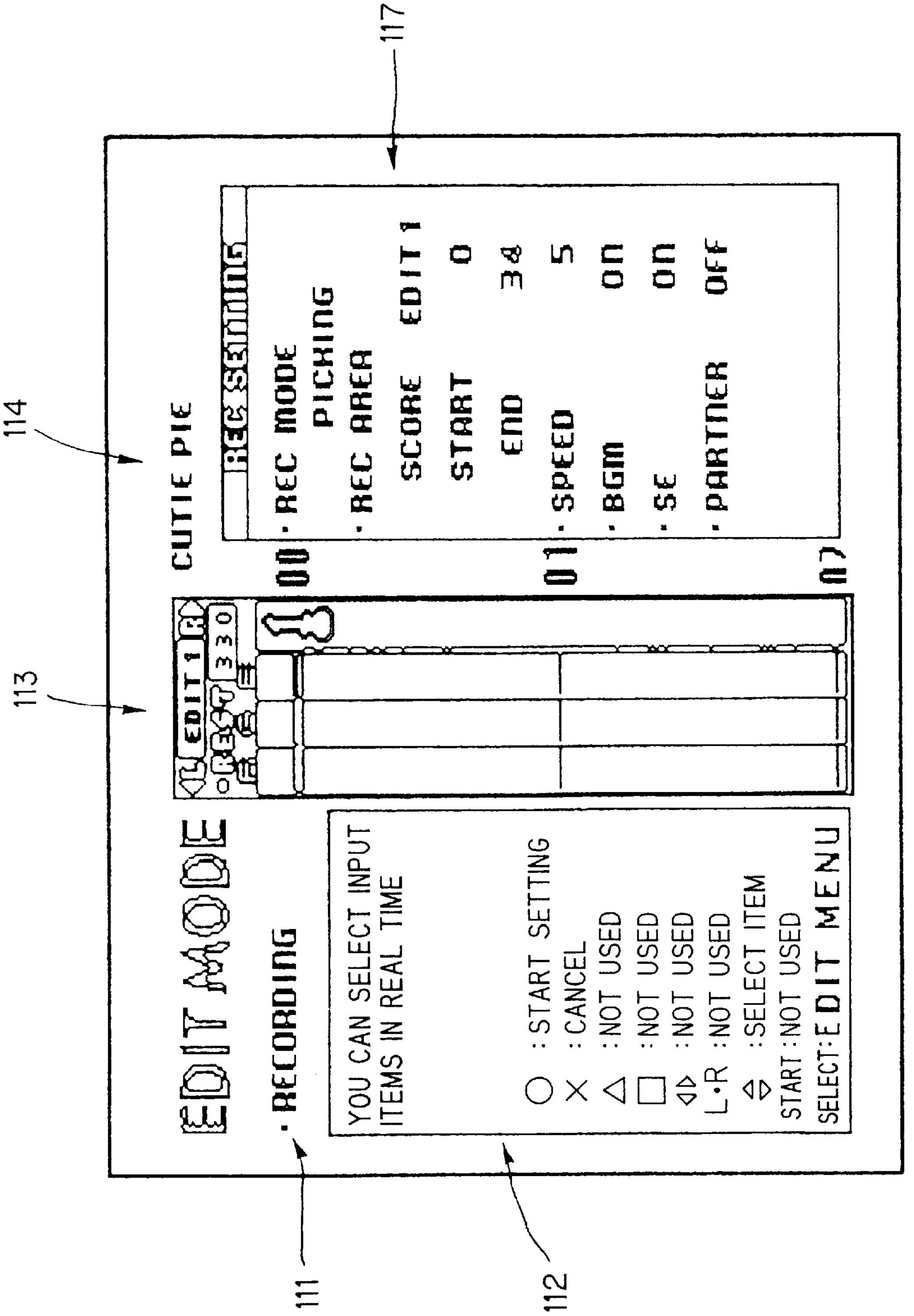
FIG. 20 is a diagram showing an example of a screen displayed when executing the recording processing of FIG. 13.

When the recording starts, the display of the edit menu screen 110 is updated in accordance with the recording (Step S101). As shown in FIG. 20, this updating comprises changing the displays of the menu display 111 and the manipulation guide display 112 in accordance with the recording. The detailed menu display 115 and the sound source display 116 are omitted, and a recording conditions display 117 is displayed instead.

"REC MODE", "REC AREA", "SPEED", "BGM", "SE" and "PARTNER" are displayed in the recording conditions display 117 as options which can be set during recording. By manipulating the controller 12A to select one of these items, the player can set the recording conditions corresponding to the selected item.

When "REC MODE" has been selected, the following recording methods can be specified. A picking mode for specifying only the timing of the picking manipulation; an RGB mode for specifying only the fret manipulation; and a picking+RGB mode for specifying the timing of the picking manipulation and the fret manipulation.

When "REC AREA" has been selected, performance data which is to be used as the basis for creating performance data in the recording process can be selected from the data in the CD-ROM 15 and from the data in the auxiliary memory apparatus 13. In addition, the start and end positions of the performance data recording can be specified by bar units. When "SPEED" has been selected, the scrolling speed of the indicator during recording can be specified. When "BGM" has been selected, the player can specify whether or not to reproduce the BGM waveform data (see FIG. 7) during recording. When "SE" has been selected, the player can specify whether or not to reproduce the sound effect in response to the manipulation of the controller 12A during recording. When "PARTNER" has been selected, the player can specify whether or not to reproduce a sound effect based on a second performance data when creating a first performance data for twin. The "PARTNER" item cannot be selected when creating data for solo.

When the screen is updated in Step S101 of FIG. 13, it is determined whether the controller 12A has been manipulated so as to change the settings for the recording conditions (Step S102). When it is determined that such a manipulation has been carried out, the settings for the recording conditions are changed in accordance with that manipulation (Step S103). Then, it is determined whether the controller 12A has been manipulated so as to start the recording (Step S104), and if not, it is determined whether the controller 12A has been manipulated so as to end the recording (Step S105). If so, the recording process ends; if not, the processing returns to Step S102.

When the player has specified to start recording, the position of the musical script displayed in the musical script display section 113 which overlaps with the edit bar 120 is adjusted so as to match the record start position which has been specified as a recording condition. Thereafter, scrolling through the musical script commences at a speed specified by the recording conditions, and a manipulation of the controller 12A is detected (Step S106). It is determined whether a picking manipulation has been detected (Step S107). When a picking manipulation has been detected, it is determined whether the picking+RGB mode has been selected as the present recording method (Step S108). When it has not been selected, it is determined whether the picking mode has been selected (Step S109). When the selected mode is the picking mode, the note mark 36R is added at a position overlapping with the edit bar 120 of the area 32R of the indicator 31 displayed in the musical script display section 113 (Step S110). In the case where the note mark 36R already exists, it is deleted. On the other hand, when it is determined that the picking mode has not been selected in Step S109, no note marks are added or deleted.

When Step S108 is determined affirmatively, and when the picking manipulation has been detected in Step S107, it is determined whether the fret manipulation has been carried out at that point (Step S111). When the fret manipulation is detected, a note mark 36 is added at a position overlapping the edit bar 120 of the areas 32R, 32G and 32B which correspond to the neck button where the fret manipulation was detected (Step S112). When a note mark already exists at that position, it is deleted. When multiple neck buttons have been manipulated simultaneously, the note marks 36 for the areas corresponding to all the manipulated neck buttons are added or deleted. When no fret manipulation was detected in Step S11l, Step S112 is omitted.

When no picking manipulation was detected in Step S107, it is determined whether a fret manipulation has been detected (Step S113). When a fret manipulation is detected, it is determined whether the RGB mode has been selected as the present recording method (Step S114). When the RGB mode is selected, the note marks 36 which were located in or near the edit bar 120 when the manipulation was detected are moved to the areas 32R, 32G or 32B corresponding to the neck buttons 23R, 23G and 23B where the fret was manipulated (Step S115). When multiple neck buttons have been manipulated simultaneously, the note marks 36 are arranged in the areas corresponding to all the manipulated neck buttons. When Steps S113 and S114 are determined negatively, Step S115 is omitted.

Figure 22:
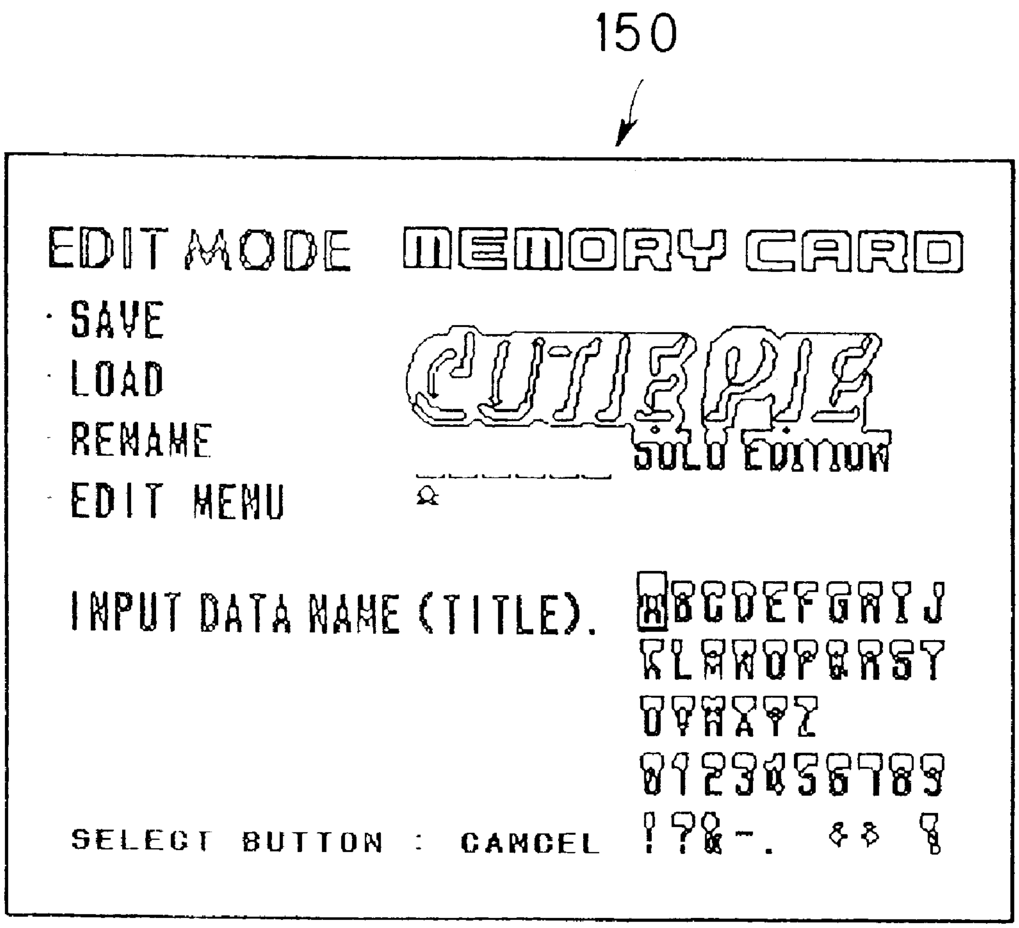
FIG. 22 is a diagram showing an example of a screen displayed when saving the performance data which was created in the editing process of FIG. 9 in an auxiliary memory apparatus.
Figure 23:
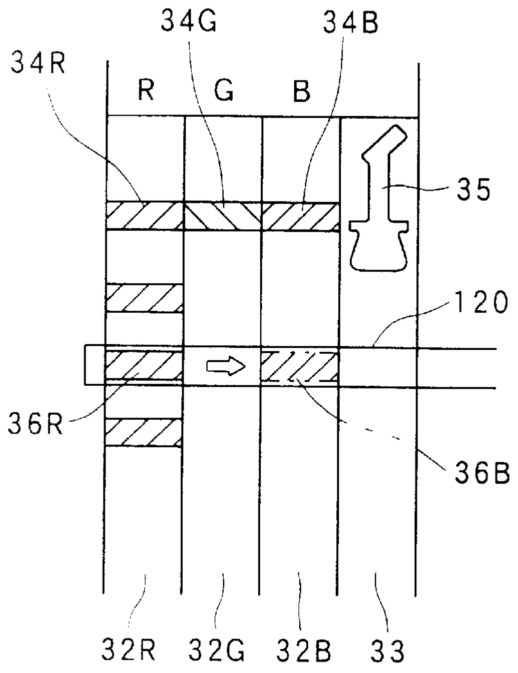
FIG. 23 is a diagram showing an example of an indicator display when changing neck buttons to be fret-manipulated in the editing process of FIG. 10.

It is determined whether the musical script has been scrolled until the record end position of the musical script has reached the edit bar 120 (Step S116), and if not, processing returns to Step S107. When the musical script has been scrolled as far as the record end position, a process to end recording is carried out (Step S117) and processing returns to Step S102. The recording ends when a predetermined return manipulation is carried out to the controller 12A. The player is asked to confirm whether he or she wants to record the created data in the auxiliary memory apparatus 13, and when he or she wishes to record it, the save screen 150 shown in FIG. 22 is displayed and a data save process is carried out.

According to the recording processes described above, when recording starts in the picking mode, the note mark 36R is added or deleted at a position which overlaps the edit bar 120 of the area 32R of the indicator 31 at every time a picking manipulation is carried out. Thus it is possible to continuously specify the position (timing) at which the picking manipulation should be carried out during the musical piece, in accordance with progress of the musical piece. Furthermore, when recording starts in the RGB mode, note marks displayed at a specific area in the indicator 31 can be moved or copied to another area 32, enabling specifications relating to the fret manipulation to be changed. When the picking+RGB mode has been selected, picking can be carried out while manipulating the neck buttons 23R, 23G and 23B separately, thereby enabling the player to arrange the note marks 36 in the indicator 31 in an alignment of his or her choice in a single recording operation. In the case where the note marks cannot easily be arranged in the picking+RGB mode, the player need select the picking mode and define only the timing of the picking manipulations, and then select the RGB mode and adjust the specifications of the fret manipulations. Of course, note marks arranged in the picking mode may be moved one by one to desired positions during editing.

In the recording processing, sound effects corresponding to the note marks 36 may be automatically allocated simultaneous to arranging the note marks 36. As for example shown in FIG. 25, when a new note mark 36 has been provided in the edit bar 120, after first detecting the distances La and Lb from the new note mark to the note marks 36 which already exist before and behind it, a sound effect which is identical to the sound effect allocated to the nearer of the two note marks 36 (La in the example shown in FIG. 25) can then be allocated to the new note mark 36.

Figure 21:
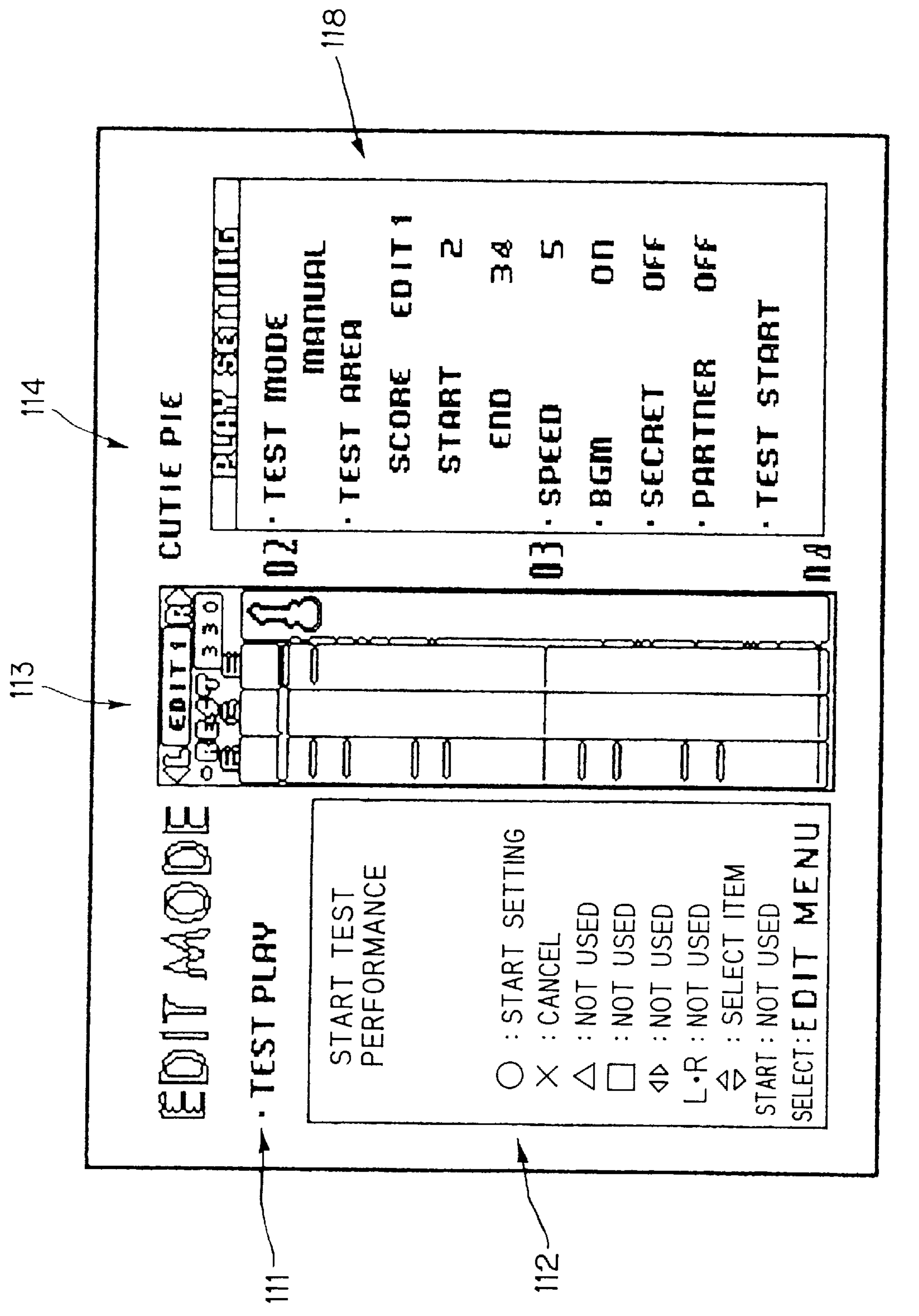
FIG. 21 is a diagram showing an example of a screen displayed when carrying out a test reproduction of performance data which was created in the editing process of FIG. 9.

Performance data which has been created in the manner described above can be reproduced in its entirety by selecting "TEST PLAY" from the menu display section 111 of the edit menu screen of FIG. 16, thereby enabling the player to confirm the quality of the performance data. FIG. 21 shows an example of a screen display when "TEST PLAY" has been selected. In this example, the recording conditions display 117 in the screen of FIG. 20 is replaced by a test conditions display 118. When reproducing the test, as when recording, it is possible to select reproduction start and end positions, reproduction speed, BGM On/Off, allow or prohibit display of note marks, and allow or prohibit the reproduction of sound effects based on a partner's performance data. Furthermore, when "FREE PLAY" has been selected from the menu display section 111 in the menu screen of FIG. 16, the game can be played based on performance data which was created previously and stored in the RAM 3. The same can be applied when "FREE" is selected from the menu of FIG. 14.

The present invention is not restricted to the embodiment described above and may be modified in various ways. For example, the number of picking levers and neck buttons may be altered as appropriate. The controller for special use 12B is not restricted to a representation of a guitar, and may be a representation of any type of musical instrument. It is acceptable to use an input apparatus which is manipulated by another part, such as the feet. The note marks 36 and 37 may be displayed in various shapes.

In the embodiment described above, manipulation guide device, editing device, edit screen display device, scrolling device, edit executing device, timing adjusting device, sound effect setting device, sample display device, allocation executing device, edit recording device and mode selecting device are realised by combining the CPU 1 and the peripheral devices and/or specific software. At least one of these units may be replaced by a logic circuit which uses an LSI or the like.

As described above, according to this aspect, it is possible to change only the specifications of a selection manipulation member to be manipulated in correspondence with the manipulation of a timing manipulation member of an input apparatus, and conversely to change only the timing at which the timing manipulation member is manipulated, without changing the timings which control the timing manipulation member. Therefore, an operation of editing the performance data is easier to understand than when simultaneously changing the specifications relating to the manipulation timing and selection manipulation members, whereby even a person who is not familiar with the manipulation can create performance data as he or she desires without confusion.

What is claimed is:

1. A game system comprising:

an input apparatus which is manipulated by a player;

performance data memory device which stores performance data stipulating a series of manipulations of said input apparatus arranged in correspondence with a predetermined musical piece;

manipulation guide device which specifies the series of manipulations of said input apparatus arranged in correspondence with said musical piece to the player based on said performance data;

said performance data comprising information which specifies timings of manipulations relating to at least one timing manipulation member provided on said input apparatus, and information which specifies at least one selection manipulation member to be manipulated in correspondence with the manipulation of said timing manipulation member from a plurality of selection manipulation members provided on said input apparatus; and editing device which edits either one of the information specifying said manipulation timing of said performance data and the information specifying said selection manipulation member independently of the other based on a command supplied by a player via said input apparatus.

2. The game system according to claim 1, further comprising edit screen display device which arranges note marks corresponding to manipulations of said timing manipulation members contained in a predetermined range of said musical piece so that their corresponding relationship with said selection manipulation members to be manipulated in correspondence with manipulation of said timing manipulation members is identifiable in a predetermined direction along a time axis based on said performance data;

scrolling device which changes the correspondence relationship between said musical piece and said predetermined range in response to a predetermined scrolling manipulation of said input apparatus so that an editing position set in said edit screen moves forward or backward in relation to said musical piece; and edit executing device which changes the information specifying said selection manipulation member in response to a predetermined selection setting manipulation of said input apparatus so that the correspondence relationship between a note mark displayed at said editing position of said edit screen and said selection manipulation member changes.

3. The game system according to claim 2 wherein said editing device comprises timing adjusting device which changes the information specifying a timing of a manipulation of said timing manipulation member so that said timing corresponding to a note mark displayed at said editing position of said edit screen changes in response to a timing adjustment manipulation of said input apparatus.

4. The game system according to claim 2 or 3, further comprising audio output device; and sound effect data recording device in which sound effect data for reproducing a plurality of sound effects via said audio output device are stored;

said performance data comprising information specifying allocations of said sound effects to each manipulation of said input apparatus; and said editing device comprising sound effect setting device which changes the information specifying the allocations of said sound effects in response to a sound effect setting manipulation of said input apparatus so that the allocations of said sound effects to manipulations corresponding to note marks displayed at said editing position of said edit screen changes.

5. The game system according to claim 4, said editing device further comprising sample display device which displays a sample screen showing a correspondence relationship between manipulation of said input apparatus stipulated by performance data set as a sample and the allocations of said sound effects; and allocation executing device which allocates sound effects displayed in said sample screen as sound effects corresponding to note marks displayed at said editing position of said edit screen.

6. The game system according to claim 5 wherein performance data being edited can be set as said sample.

7. The game system according to claim 5 wherein a plurality of performance data are provided for a single musical piece, and performance data different from the performance data being edited can be set as said sample.

8. A game system comprising:

an input apparatus which is manipulated by a player;

performance data memory device which stores performance data stipulating a series of manipulations of said input apparatus arranged in correspondence with a predetermined musical piece;

manipulation guide device which specifies the series of manipulations of said input apparatus arranged in correspondence with said musical piece to the player based on said performance data;

said performance data comprising information which specifies timings of manipulations relating to at least one timing manipulation member provided on said input apparatus, and information which specifies at least one selection manipulation member to be manipulated in correspondence with the manipulation of said timing manipulation member from a plurality of selection manipulation members provided on said input apparatus;

edit screen display device which displays an edit screen having a display range corresponding to part of said musical piece based on said performance data;

scrolling device which continuously changes the relationship between said musical piece and said display range in response to a predetermined record start manipulation of said input apparatus so that the editing position in said edit screen continuously changes forwards or backwards with respect to said musical piece; and edit recording device which detects at least one part of the manipulations of said timing manipulation members and said plurality of selection manipulation members with respect to said input apparatus while the relationship between said musical piece and said display range is being changed by said scrolling device, displays a note mark corresponding to the detected manipulation in said edit screen, and changes said performance data so that the manipulation corresponding to the note mark is stipulated in said performance data.

9. The game system according to claim 8, further comprising mode selecting device in which a timing specifying mode for specifying only the timing of manipulations of said timing manipulation member can be selected; and wherein when said timing specifying mode is selected, said edit recording device detects a manipulation of said timing manipulation member, displays a note mark corresponding to the detected manipulation in said edit screen, and changes the information specifying said timing of said performance data so that the manipulation corresponding to said note mark is stipulated by said performance data.

10. The game system according to claim 8, further comprising mode selecting device in which a timing specifying mode for specifying only the timing of manipulations of said timing manipulation member can be selected; and wherein when said timing specifying mode is selected, said edit recording device detects a manipulation of said timing manipulation member, displays a note mark corresponding to the detected manipulation in said edit screen in correspondence with a specific selection manipulation member, and changes the information specifying said timing and the information specifying the selection manipulation member of said performance data so that the manipulation corresponding to the note mark is stipulated in said performance data as a manipulation of said timing manipulation member in correspondence with the manipulation of said specific selection manipulation member.

11. The game system according to any of claims 8 to 10, further comprising mode selecting device in which a selection change mode for changing a specification of said selection manipulation member stipulated in performance data being edited can be selected; and wherein said edit screen display device displays note marks in correspondence with manipulations of said timing manipulation members contained in said display range of said musical piece in a predetermined direction along the time axis based on the performance data being edited, so that the relationship between said note marks and said selection manipulation members to be manipulated in correspondence with manipulations of the timing manipulation member is identifiable; and when said selection change mode is selected, said edit recording device detects a manipulation of said selection manipulation member, changes the relationship between said selection manipulation member and said note mark displayed at said editing position in said edit screen at the point when the manipulation is detected based on said detected manipulation, and changes the information specifying said selection manipulation member in said performance data in accordance with the change.

12. A computer-readable recording medium which stores performance data stipulating a series of manipulations of an input apparatus provided in a game system in correspondence with a predetermined musical piece, said performance data comprising information which specifies timings of manipulations relating to at least one timing manipulation member provided in said input apparatus, and information which specifies at least one selection manipulation member to be manipulated in correspondence with the manipulation of said timing manipulation member from a plurality of selection manipulation members provided in said input apparatus; the recording medium further storing a program which allows a computer provided in said game system to function as editing device for editing either one of the information specifying said manipulation timing of said performance data and the information specifying said selection manipulation member independently of the other based on a command supplied by a player via said input apparatus.

13. A computer-readable recording medium which stores performance data stipulating a series of manipulations of an input apparatus provided in a game system in correspondence with a predetermined musical piece, said performance data comprising information which specifies timings of manipulations relating to at least one timing manipulation member provided in said input apparatus, and information which specifies at least one selection manipulation member to be manipulated in correspondence with the manipulation of said timing manipulation member from a plurality of selection manipulation members provided in said input apparatus; the recording medium further storing a program which allows a computer provided in said game system to function as edit screen display device which displays an edit screen having a display range corresponding to part of said musical piece based on said performance data;

scrolling device which continuously changes the relationship between said musical piece and said display range in response to a predetermined record start manipulation of said input apparatus so that the editing position in said edit screen continuously changes forwards or backwards with respect to said musical piece; and edit recording device which detects at least one part of the manipulations of said timing manipulation members and said plurality of selection manipulation members with respect to said input apparatus while the relationship between said musical piece and said display range is being changed by said scrolling device, displays a note mark corresponding to the detected manipulation in said edit screen, and changes said performance data so that the manipulation corresponding to the note mark is stipulated by said performance data.

* * * * *